(12) United States Patent
Ohno et al.

(10) Patent No.: US 12,291,161 B2
(45) Date of Patent: May 6, 2025

(54) AIRBAG DEVICE

(71) Applicant: TOYOTA JIDOSHA KABUSHIKI KAISHA, Aichi-ken (JP)

(72) Inventors: Mitsuyoshi Ohno, Miyoshi (JP); Toshiki Iwama, Toyota (JP); Tatsuya Hashido, Aichi-ken (JP); Yu Suzuki, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/798,828

(22) Filed: Aug. 9, 2024

(65) Prior Publication Data
US 2025/0058734 A1 Feb. 20, 2025

(51) Int. Cl.
*B60R 21/207* (2006.01)
*B60R 21/233* (2006.01)
*B60R 21/261* (2011.01)

(52) U.S. Cl.
CPC .......... *B60R 21/207* (2013.01); *B60R 21/233* (2013.01); *B60R 21/261* (2013.01); *B60R 2021/2074* (2013.01); *B60R 2021/2612* (2013.01)

(58) Field of Classification Search
CPC ............... B60R 21/233; B60R 21/261; B60R 2021/2074; B60R 2021/2612; B60R 21/207
See application file for complete search history.

(56) References Cited

U.S. PATENT DOCUMENTS

| | | | |
|---|---|---|---|
| 11,718,260 B2 * | 8/2023 | Ohachi | B60N 2/888 280/730.1 |
| 11,745,693 B2 * | 9/2023 | Ohno | B60R 21/237 280/730.2 |
| 11,772,592 B2 * | 10/2023 | Min | B60R 21/207 280/743.2 |
| 12,043,195 B2 * | 7/2024 | Ohno | B60R 21/233 |
| 12,043,200 B2 * | 7/2024 | Ohno | B60R 21/2338 |
| 2019/0016293 A1 | 1/2019 | Saso | |
| 2022/0388472 A1 * | 12/2022 | Hwangbo | B60R 21/23138 |

FOREIGN PATENT DOCUMENTS

| | | | |
|---|---|---|---|
| JP | 2016203945 A | * | 12/2016 |
| JP | 2019-018593 A | | 2/2019 |
| JP | 2019-218013 A | | 12/2019 |

* cited by examiner

Primary Examiner — Faye M Fleming
(74) Attorney, Agent, or Firm — HAUPTMAN HAM, LLP

(57) ABSTRACT

An airbag device includes: an inflator generating gas at a time of a collision of a vehicle; and an airbag to which the gas is supplied, and that inflates and expands from a seat rear side of an upper portion of a vehicle seat toward a seat front side, and slips-through between a ceiling of a vehicle cabin and a head of a passenger seated in the vehicle seat. The airbag has at least one gas supply path that is provided so as to be directed toward the seat front side and whose angle of incidence with respect to the ceiling in a side view seen from a seat transverse direction is set to be an acute angle.

7 Claims, 22 Drawing Sheets

AIRBAG DEVICE

CROSS-REFERENCE TO RELATED APPLICATION

This application is based on and claims priority under 35 USC 119 from Japanese Patent Application No. 2023-132157 filed on Aug. 14, 2023, the disclosure of which is incorporated by reference herein.

BACKGROUND

Technical Field

The present disclosure relates to an airbag device.

Related Art

The airbag device disclosed in Japanese Patent Application Laid-Open (JP-A) No. 2019-218013 has an inflator, and an airbag that expands due to gas supplied from the inflator. The airbag has a rear inflating portion that expands at the back surface side of a seat, a pair of side inflating portions extending frontward from seat transverse direction both sides of the rear inflating portion, and a pair of front inflating portions that extend from the pair of side inflating portions toward the central side, are connected to one another at the center, and cover the front side of a passenger. At this airbag, when the gas starts to be supplied, the airbag expands toward the seat front side so as to cross-over the headrest.

In the airbag device disclosed in JP-A No. 2019-218013, the inflator and the airbag are accommodated in an accommodating portion that is within the seatback. When gas starts to be supplied from the inflator, the airbag ruptures the surface of the seatback, advances-out toward the seat rear side, and starts to expand toward the upper side and the seat rear side. Therefore, it is conceivable that, in the initial stage of inflation and expansion, the airbag may catch on the ceiling of the vehicle cabin.

Further, depending on the physique of the passenger and the situation at the time of a collision of the vehicle, there is dispersion, in the seat vertical direction, of the position of the head of the passenger seated in the vehicle seat. Therefore, at the time when the airbag expands toward the seat front side so as to cross-over the headrest, there is the concern that the airbag may catch on the head of the passenger. Therefore, there is room for improvement from the standpoint of improving the airbag expansion performance.

SUMMARY

In view of the above-described circumstances, an object of the present disclosure is to provide an airbag device that can improve the expansion performance of an airbag that inflates and expands toward the seat front side from the seat rear side of the upper portion of a vehicle seat.

An airbag device of a first aspect includes: an inflator generating gas at a time of a collision of a vehicle; and an airbag to which the gas is supplied, and that inflates and expands from a seat rear side of an upper portion of a vehicle seat toward a seat front side, and slips-through between a ceiling of a vehicle cabin and a head of a passenger seated in the vehicle seat, wherein the airbag has at least one gas supply path that is provided so as to be directed toward the seat front side and whose angle of incidence with respect to the ceiling in a side view seen from a seat transverse direction is set to be an acute angle.

In the airbag device of the first aspect, at the time of a collision of the vehicle, gas generated from the inflator is supplied to the airbag. Due thereto, the airbag inflates and expands from the seat rear side of the upper portion of the vehicle seat toward the seat front side, and slips-through between the ceiling of the vehicle cabin and the head of the passenger who is seated in the vehicle seat. Here, the airbag has the at least one gas supply path that is provided so as to be directed toward the seat front side. The angle of incidence of the gas supply path with respect to the ceiling in a side view seen from the seat transverse direction is set to be an acute angle. Due thereto, the airbag can be expanded in a direction that forms an acute angle with respect to the ceiling as seen in a side view, and therefore, the airbag catching on the ceiling of the vehicle cabin is suppressed. Further, because the airbag is expanded toward an obliquely upper side from the upper portion of the vehicle seat, interference with the head of the passenger at the upper side of the vehicle seat also is suppressed. Due thereto, the expansion performance of the airbag, which inflates and expands toward the seat front side from the seat rear side of the upper portion of the vehicle seat, can be improved.

In an airbag device of a second aspect, in the first aspect, the angle of incidence is set to be 15°~35°.

In the airbag device of the second aspect, the angle of incidence of the gas supply path with respect to the ceiling of the vehicle cabin is set to be an acute angle in a range of 15°~35°. Therefore, the expansion performance of the airbag, which inflates and expands toward the seat front side from the seat rear side of the upper portion of the vehicle seat, can be improved.

In an airbag device of a third aspect, in the first aspect or the second aspect, the airbag has: a front-rear chamber having a pair of front-rear extending portions that pass left and right both sides of the head of the passenger seated in the vehicle seat and inflate and expand toward the seat front side, and a front connecting portion connecting front end portions of the pair of front-rear extending portions in the seat transverse direction; and an airbag main body that, at a seat rear side of the front connecting portion, inflates and expands toward the passenger side later than the front-rear chamber, and that, at a time of restraining the passenger, is compressed in a seat front-rear direction while stretching the front-rear chamber in the seat front-rear direction.

In the airbag device of the third aspect, the airbag has the front-rear chamber and the airbag main body. The front-rear chamber passes the left and right both sides of the head of the passenger seated in the vehicle seat, and the left and right pair of front-rear extending portions inflate and expand toward the seat front side. Then, the front connecting portion, which connects the front end portions of the pair of front-rear extending portions in the seat transverse direction, slips through between the ceiling of the vehicle cabin and the head of the passenger, and is disposed at the front side of the passenger. Thereafter, the airbag main body inflates and expands toward the passenger side, at the seat rear side of the front connecting portion and later than the front-rear chamber. Due thereto, when gas is supplied from the gas supply path, the airbag is expanded in a direction in which the left and right pair of front-rear extending portions form acute angles with respect to the ceiling. Therefore, the front connecting portion and the airbag main body catching on the ceiling of the vehicle cabin is suppressed. Further, because the front connecting portion and the airbag main body are expanded toward an obliquely upper side from the upper portion of the vehicle seat, at the upper side of the vehicle seat, interference with the head of the passenger also is suppressed. Further, at the time of restraining the passenger, the airbag main body is compressed in the seat front-rear direction while stretching the front-rear chamber in the seat front-rear direction. The energy absorbing performance of the airbag can be improved due to this compressive deformation of the airbag main body.

In an airbag device of a fourth aspect, in the third aspect, the gas supply paths include a first gas supply path and a second gas supply path provided at rear end portions of the pair of front-rear extending portions, and the first gas supply path and the second gas supply path are inclined toward outer sides in the seat transverse direction so as to be at a predetermined angle of inclination with respect to the seat front-rear direction as seen in a plan view.

In the airbag device of the fourth aspect, a first gas supply path and a second gas supply path, which are provided at the rear end portions of the pair of front-rear extending portions, are included as the gas supply paths. As seen in a plan view, the first gas supply path and the second gas supply path are inclined toward outer sides in the seat transverse direction so as to be at a predetermined angle of inclination with respect to the seat front-rear direction. Therefore, at the time, when gas is supplied from the first gas supply path and the second gas supply path, the pair of front-rear extending portions pass the left and right both sides of the head of the passenger and inflate and expand obliquely toward the seat front side and the seat transverse direction outer sides. Due thereto, even in a case in which the position of the head of the passenger is offset in the seat transverse direction, interference between the pair of front-rear extending portions and the head of the passenger at the sides of the vehicle seat is suppressed.

In an airbag device of a fifth aspect, in the fourth aspect, the angle of inclination of the first gas supply path and the second gas supply path with respect to the seat front-rear direction is set to be 10°~45°. Due thereto, at the sides of the vehicle seat, interference with the head of the passenger is suppressed, and the expansion performance of the airbag, which inflates and expands from the seat rear side of the upper portion of the vehicle seat toward the seat front side, can be improved.

In an airbag device of a sixth aspect, in any one of the third through fifth aspects, the front-rear chamber further has a rear connecting portion that is accommodated at a seat rear side of the airbag main body in a state before gas is supplied, and that connects rear end portions of the pair of front-rear extending portions in the seat transverse direction.

In the airbag device of the sixth aspect, the front-rear chamber has the rear connecting portion that connects the rear end portions of the pair of front-rear extending portions in the seat transverse direction. In the state before gas is supplied, this rear connecting portion is accommodated at the seat rear side of the airbag main body. Due thereto, when gas is supplied from the gas supply path, the rear connecting portion inflates at the seat rear side of the airbag main body, and can push the airbag main body out toward the seat front side. As a result, the robustness of the airbag main body at the time of inflation and expansion improves, and the behavior at the time of slipping-through between the ceiling of the vehicle cabin and the head of the passenger can be stabilized.

In an airbag device of a seventh aspect, in the sixth aspect, the gas supply paths are structured to include a third gas supply path connected to a rear side surface of the rear connecting portion.

In the airbag device of the seventh aspect, a third gas supply path that is connected to the rear side surface of the rear connecting portion is included as a gas supply path. Due thereto, through the third gas supply path, the rear connecting portion can be rapidly inflated and expanded toward the seat front side. Due thereto, in the initial stage of inflation and expansion, the airbag main body is pushed-out in a direction that forms an acute angle with respect to the ceiling of the vehicle cabin, and the behavior at the time when the airbag main body slips-through between the ceiling of the vehicle cabin and the head of the passenger can be stabilized even more.

As described above, in the airbag device relating to the present disclosure, the expansion performance of an airbag, which inflates and expands from the seat rear side of the upper portion of a vehicle seat toward the seat front side, can be improved.

BRIEF DESCRIPTION OF THE DRAWINGS

Exemplary embodiments of the present invention will be described in detail based on the following figures, wherein.

DETAILED DESCRIPTION

First Embodiment

Figure 1:
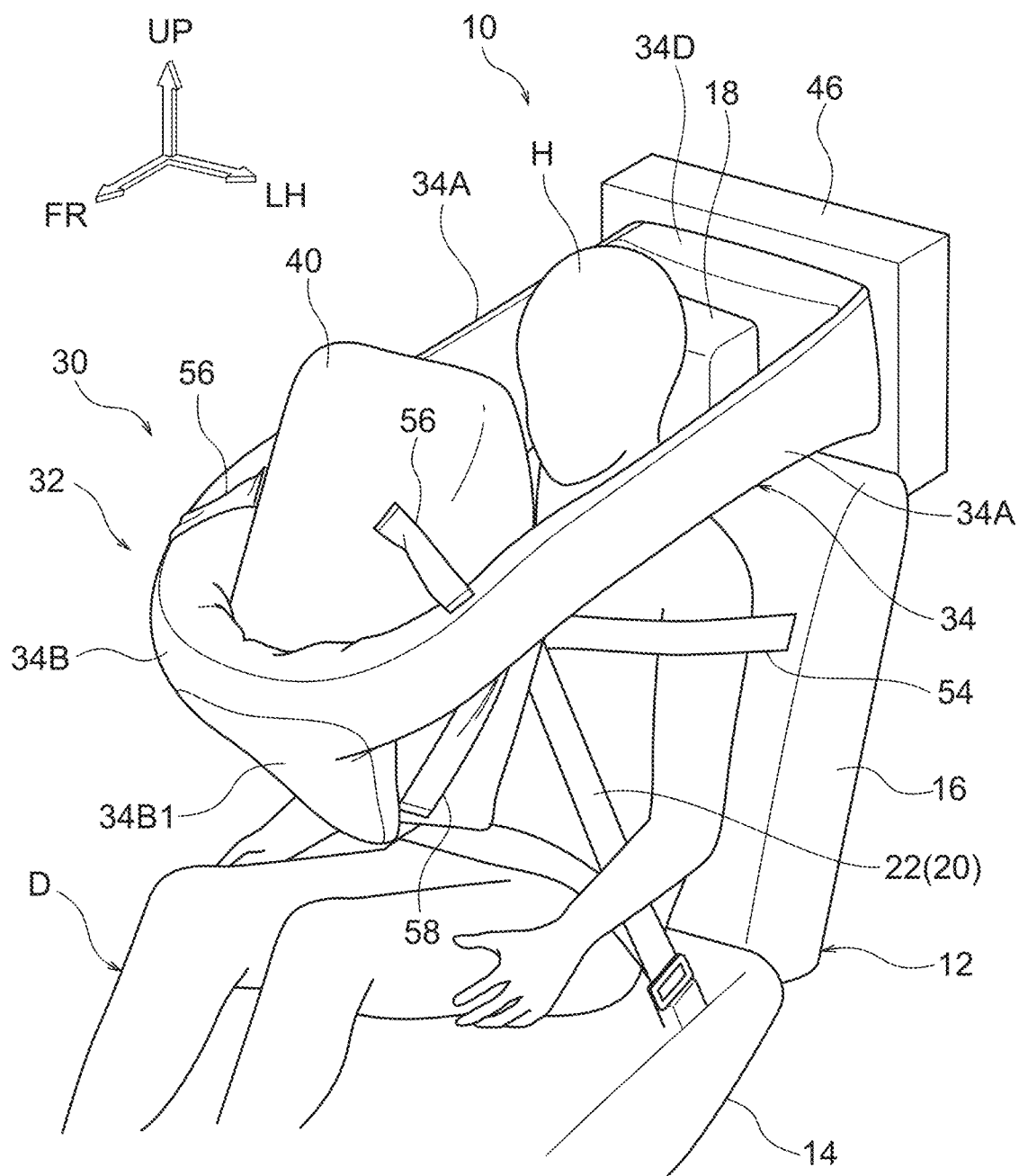
FIG. 1 is a perspective view illustrating a state in which an airbag has inflated and expanded, in an airbag device relating to a present embodiment.
Figure 2:
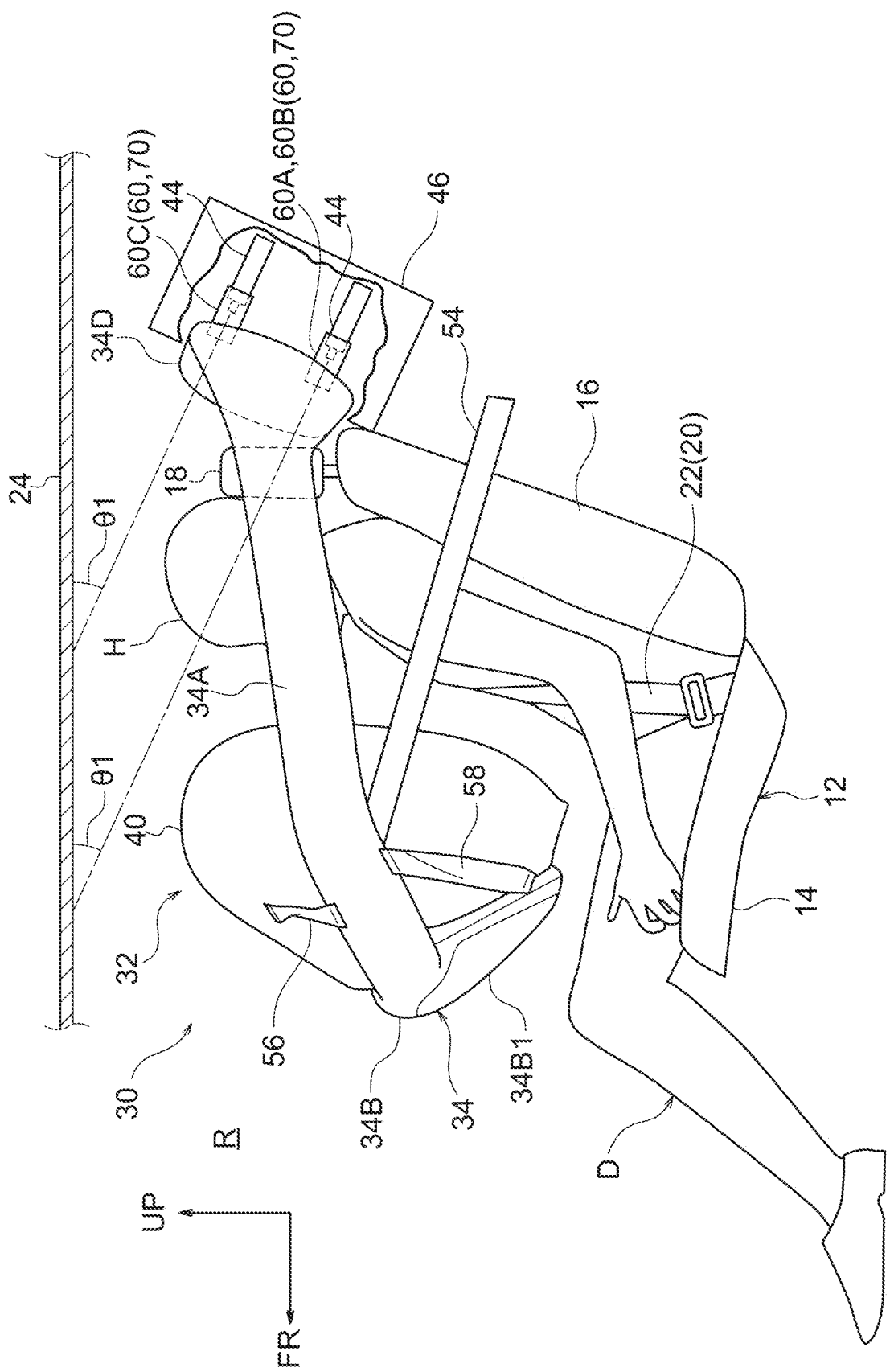
FIG. 2 is a side view illustrating the structure shown in FIG. 1 in a state of being viewed from the vehicle left side.

A passenger protecting device 10, and an airbag device 30 installed in the passenger protecting device 10, which relate to a first embodiment of the present disclosure are described hereinafter with reference to FIG. 1 through FIG. 21. Note that, in the respective drawings, there are cases in which some of the reference numerals are omitted in order to make the drawings easy to understand. Further, arrow FR, arrow UP, arrow LH and arrow RH that are shown appropriately in the respective drawings indicate the forward direction (advancing direction), upward direction, leftward direction and rightward direction of a vehicle, respectively. When description is given hereinafter by using merely front-rear, left-right, and vertical directions, they refer to the front-rear of the vehicle front-rear direction, the left-right of the vehicle left-right direction, and the vertical of the vehicle vertical direction, unless otherwise specified.

As illustrated in FIG. 1 through FIG. 5, the passenger protecting device 10 is structured by a vehicle seat 12 and the airbag device 30. The vehicle seat 12 is a front seat or a rear seat of a vehicle (automobile). The vehicle seat 12 has a seat cushion 14, a seatback 16 provided so as to stand at the upper side of the rear end portion of the seat cushion 14, and a headrest 18 connected to the upper end portion of the seatback 16. The front-rear, left-right, and vertical directions of the vehicle seat 12 coincide with the front-rear, left-right, and vertical directions of the vehicle.

Note that FIG. 1 through FIG. 5 illustrate a state in which a crash test dummy D is seated on the seat cushion 14 of the vehicle seat 12, as a model of a passenger (a seated person) who is to be protected. The dummy D is, for example, an AM50 (50th percentile U.S. adult male) that is a dummy for a front crash test (Hybrid III). The dummy D is seated in the standard seated posture prescribed by the crash test method, and the vehicle seat 12 is positioned at the standard set position corresponding to that seated posture. Hereinafter, the dummy D will be called "passenger D" in order to facilitate understanding.

The passenger D seated on the seat cushion 14 of the vehicle seat 12 is restrained in the vehicle seat 12 by a seatbelt 22 (refer to FIG. 1 through FIG. 3; not illustrated in FIG. 4 and FIG. 5) of a seatbelt device 20. The seatbelt device 20 is a three-point seatbelt device, and is a so-called seat-mounted seatbelt device in which an unillustrated retractor, anchor and buckle (none of which are denoted by reference numerals) are provided at the vehicle seat 12.

The airbag device 30 has an airbag 32, plural inflators 44 (refer to FIG. 2 and FIG. 3), and a module case 46 (not illustrated in FIG. 10 through FIG. 20). At usual times, the airbag 32 is stored in a folded-up state within the module case 46 together with the plural inflators 44. The module case 46 is formed in the shape of a rectangular parallelopiped that is hollow. The module case 46 is disposed at the rear of the upper portion of the vehicle seat 12 (specifically, at the rear of the upper end portion of the seatback 16 and the headrest 18), and is fixed to the upper end portion of the seatback 16 or to an unillustrated vehicle body.

The airbag 32 receives a supply of gas from a pair of the inflators 44, and inflates and expands (expands and inflates) from the rear side of the upper portion of the vehicle seat 12 toward the front side. This airbag 32 has a front-rear chamber 34 and an airbag main body 40. The front-rear chamber 34 has a left and right pair of front-rear extending portions 34A that inflate and expand past the left and right both sides of head H of the passenger D toward the front side, and a front connecting portion 34B that connects the front end portions of the pair of front-rear extending portions 34A in the left-right direction. Further, the front-rear chamber 34 has a rear connecting portion 34D that connects the rear end portions of the pair of front-rear extending portions 34A in the left-right direction. The airbag main body 40 inflates and expands at the rear side of the front connecting portion 34B toward the passenger D side (the rear side), later than the front-rear chamber 34.

Figure 6:
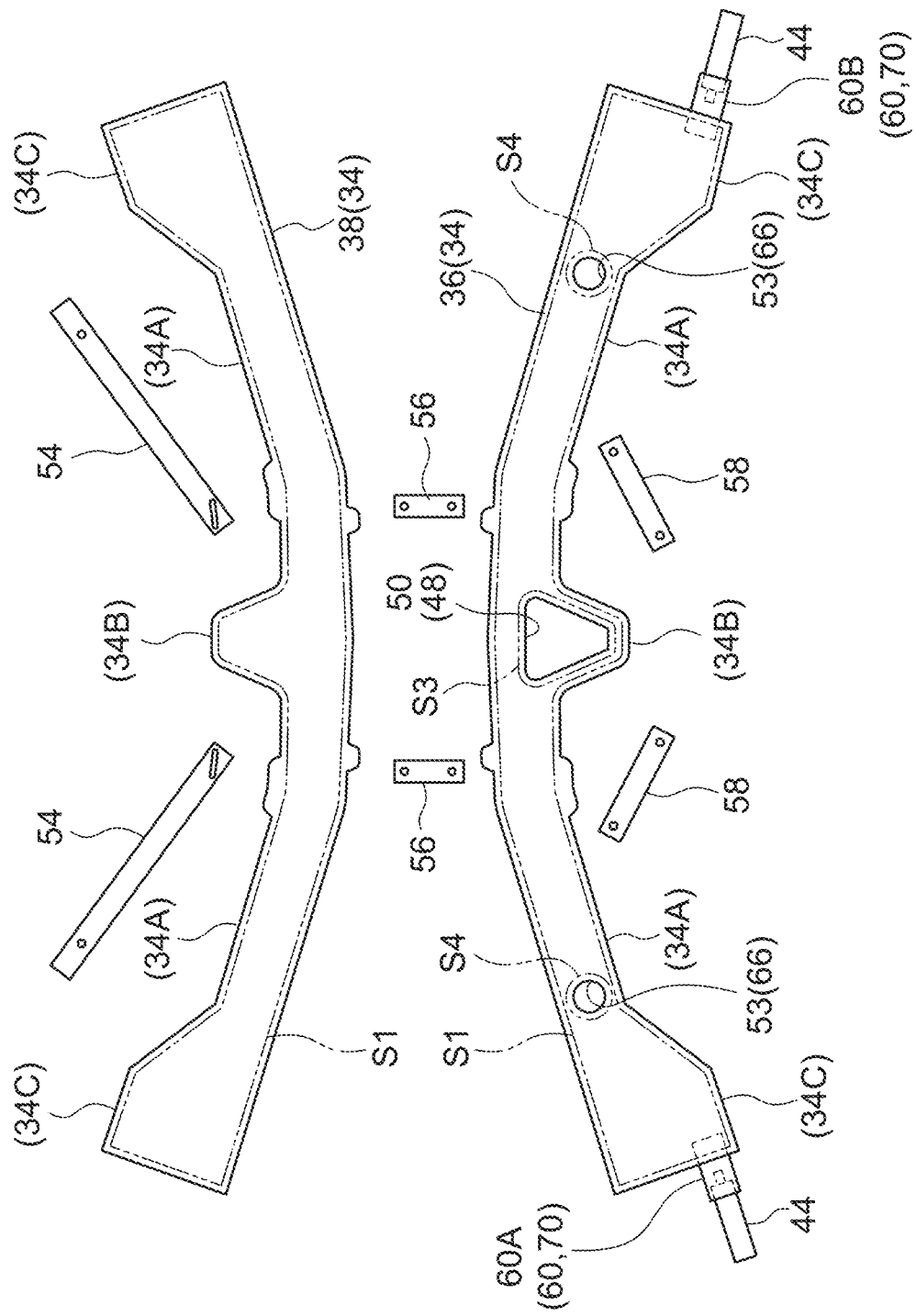
FIG. 6 is an expanded view of a region corresponding to a front connecting portion and a pair of front-rear extending portions of a front-rear chamber of the airbag.
Figure 7:
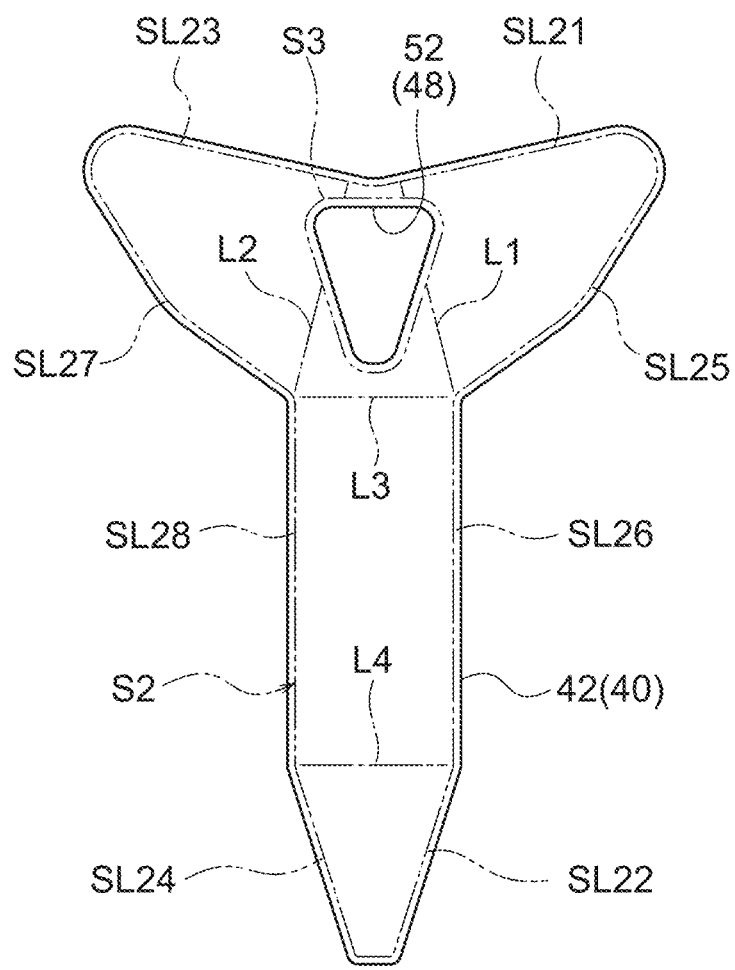
FIG. 7 is an expanded view of an airbag main body of the airbag.

The front-rear chamber 34 is formed in the shape of an elongated bag due to two elongated base fabrics 36, 38 that are illustrated in FIG. 6 being superposed and the peripheral edge portions thereof being sewn together at sewn portion S1. The airbag main body 40 is formed in the shape of a bag due to a single base fabric 42 illustrated in FIG. 7 being folded-over along four fold lines L1, L2, L3, L4, and being sewn together at sewn portion S2. At this sewn portion S2, sewing line SL21 and sewing line SL22 are sewn together, sewing line SL23 and sewing line SL24 are sewn together, sewing line SL25 and sewing line SL26 are sewn together, and sewing line SL27 and sewing line SL28 are sewn together. The above-described base fabrics 36, 38, 42 are structured by fabric materials of nylon or polyester for example. One or both of the two base fabrics 36, 38 that structure the front-rear chamber 34 is a base fabric that is harder to stretch than the base fabric 42 structuring the airbag main body 40.

The length direction both end portions of the front-rear chamber 34 are a left and right pair of inflator accommodating portions 34C that accommodate a pair of the inflators 44. Gas supply paths 60, which supply gas from the inflators 44 to the interior of the front-rear chamber 34, are formed within the pair of inflator accommodating portions 34C. The gas supply paths 60 are formed by diffusers 70 that are tubular being placed within the inflator accommodating portions 34C. The diffusers 70 are manufactured of metal pipes for example, and have rectilinear sections that are directed toward the front-rear chamber 34. The gas supply paths 60 that are rectilinear are formed by the gas jetting ports (not denoted by any reference numerals) of the inflators 44 being fixed to length direction end portions of the diffusers 70.

The length direction central portion of the front-rear chamber 34 is the front connecting portion 34B. The portions between the front connecting portion 34B and the pair of inflator accommodating portions 34C are the front-rear extending portions 34A respectively. The pair of inflators 44 are combustion or cold gas cylindrical inflators, and generate gas by being operated. Operation of the inflators 44 is controlled by an unillustrated control device, and the inflators 44 are made to generate gas at the time of a collision of the vehicle.

Here, the pair of inflator accommodating portions 34C are disposed within the module case 46 so as to be dispersed at the left and right both sides. Further, the gas supply paths 60 that are provided at the inflator accommodating portions 34C are provided so as to be directed toward the seat front side. In the state in which the gas supply paths 60 are accommodated within the module case 46, the gas supply paths 60 extend obliquely toward the seat front side and the seat upper side. In particular, in the present embodiment, the gas supply paths 60 are set such that incidence angle θ1 of the gas supply paths 60 with respect to a ceiling 24 of vehicle cabin R in a side view seen from the seat transverse direction, is an acute angle.

The incidence angle θ1 of the gas supply paths 60 is set within the range of 15°~35°, and is more preferably set to be 25°.

Hereinafter, as needed, the gas supply path 60, which is provided at the rear end portion of the front-rear extending portion 34A at one end side in the length direction of the front-rear chamber 34, is called first gas supply path 60A, and the gas supply path 60, which is provided at the rear end portion of the front-rear extending portion 34A at the another end side in the length direction of the front-rear chamber 34, is called second gas supply path 60B.

Figure 3:
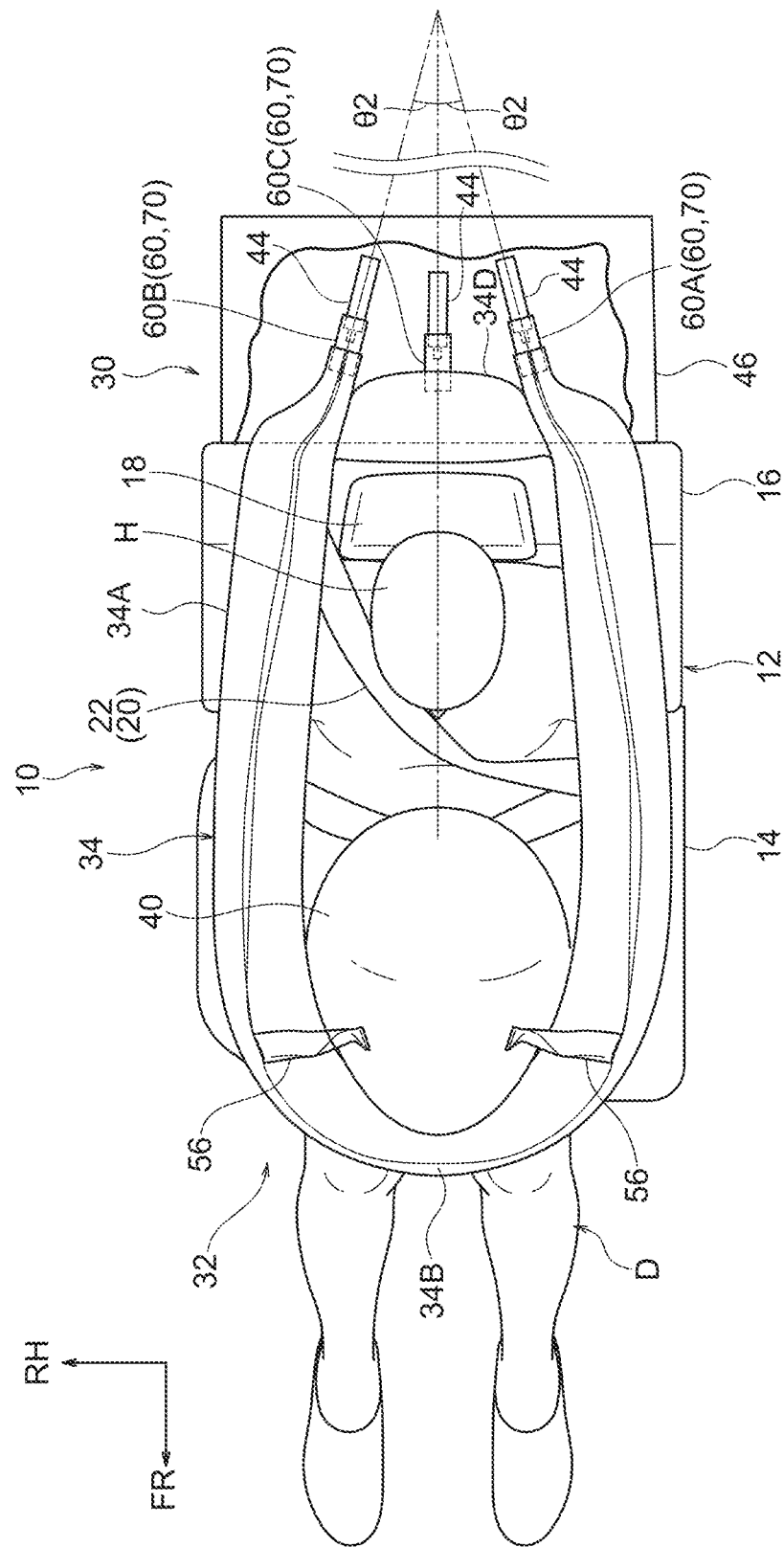
FIG. 3 is a plan view illustrating the structure shown in FIG. 1 in a state of being viewed from the vehicle upper side.
Figure 4:
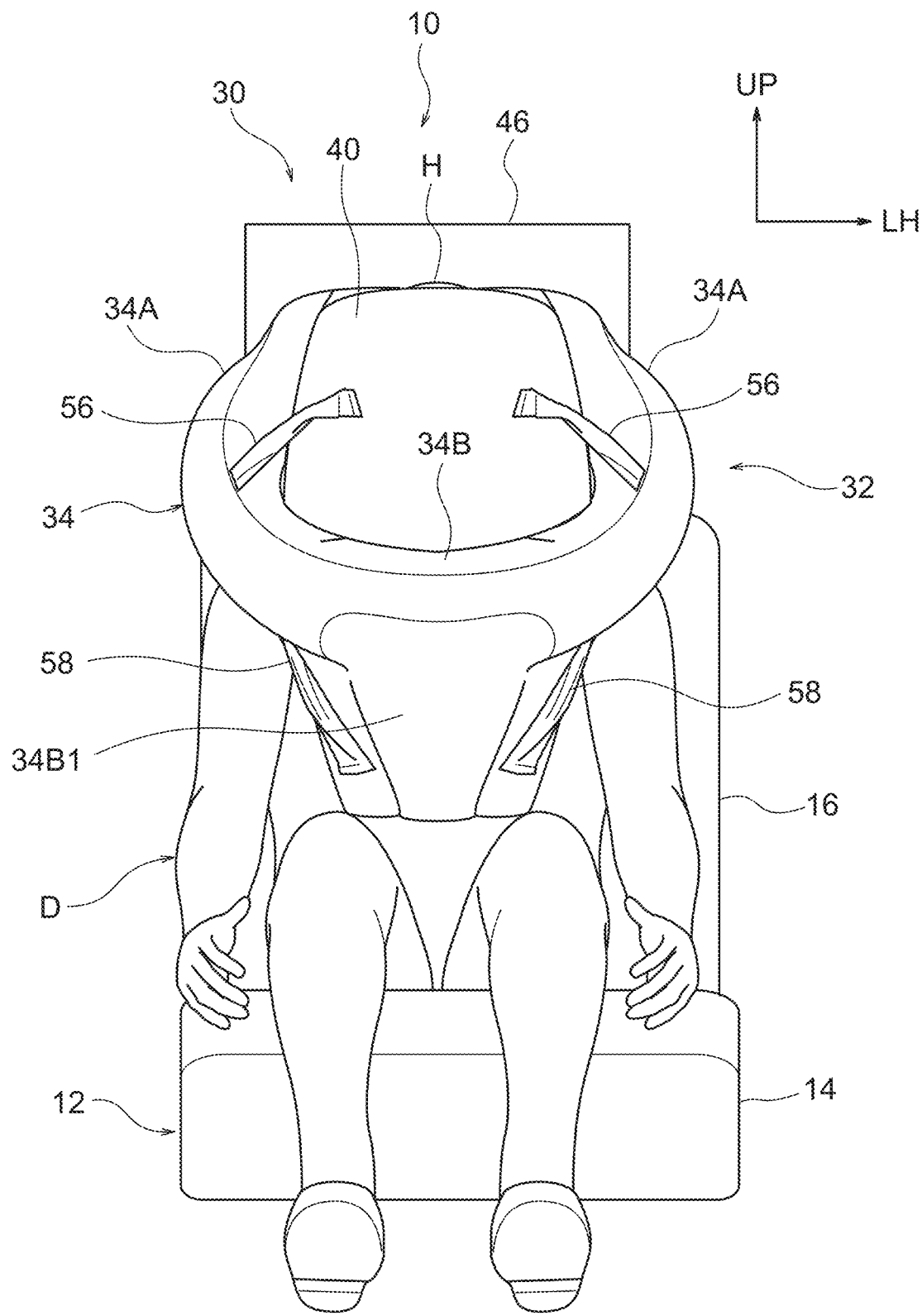
FIG. 4 is a front view illustrating the structure shown in FIG. 1 in a state of being viewed from the vehicle front side.
Figure 5:
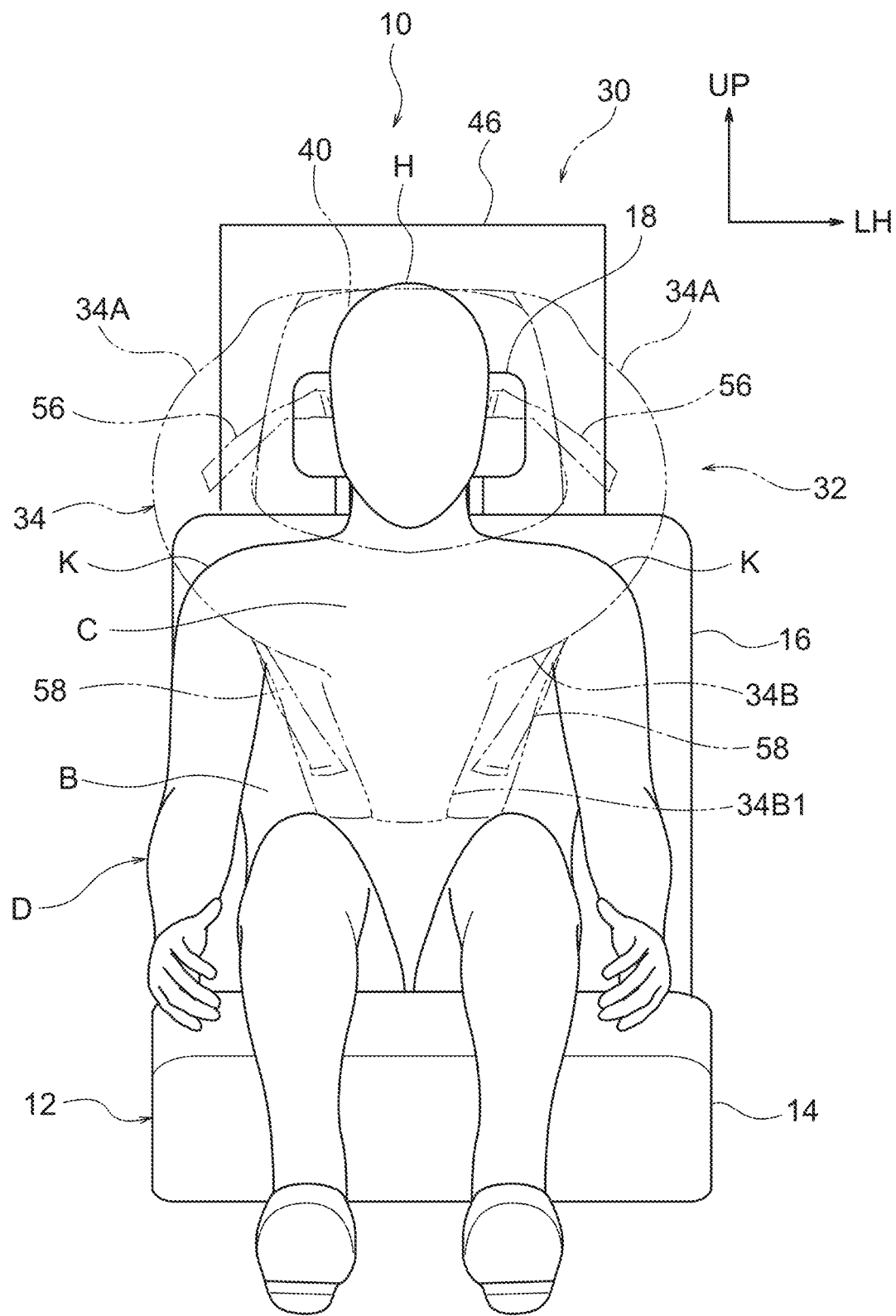
FIG. 5 is a front view in a state of looking through the airbag in FIG. 4.

Further, as illustrated in FIG. 3, the first gas supply path 60A and the second gas supply path 60B are inclined toward the outer sides in the seat transverse direction so as to be at a predetermined inclination angle θ2 with respect to the seat front-rear direction as seen in a plan view.

The inclination angle θ2 of the first gas supply path 60A and the second gas supply path 60B with respect to the seat front-rear direction is set within the range of 10°~45°, and is more preferably set to be 15°.

Due to portions of or the entireties of the inflators 44 being inserted within the gas supply paths 60, the inflators 44 are disposed so as to be directed toward the seat front side, and are disposed in postures in which the axial directions thereof are inclined toward the seat upper side with respect to the seat front-rear direction. Namely, the respective inflators 44 are disposed in postures in which, in a side view seen from the seat transverse direction, the incidence angle θ1 of the inflators 44 with respect to the ceiling 24 of the vehicle cabin R is set to be an acute angle that is similar to that of the gas supply paths 60.

Stud bolts are provided at each inflator 44 as a pair at the both end portions in the axial direction for example. The pairs of stud bolts pass through the inflator accommodating portions 34C, the module case 46, and unillustrated brackets supported at the frame of the seatback 16, and nuts are screwed-together with these stud bolts. Due thereto, the inflator accommodating portions 34C, the inflators 44 and the module case 46 are fixed to the frame of the seatback 16.

The pair of front-rear extending portions 34A are respectively formed in elongated tube shapes. The front connecting portion 34B is formed in the shape of a substantially T-shaped bag that communicates with the respective front-rear extending portions 34A. The front connecting portion 34B is sewn to the airbag main body 40 at sewn portion S3 (refer to FIG. 6 and FIG. 7) that is provided at the central portion of the front connecting portion 34B. As an example, the sewn portion S3 is formed in a substantially upside-down trapezoidal shape. A communication hole 48, which communicates the interior of the front connecting portion 34B and the interior of the airbag main body 40, is formed at the inner side of the sewn portion S3. As an example, the communication hole 48 is formed in a substantially upside-down trapezoidal shape. The communication hole 48 is structured by a through-hole 50 formed in the base fabric 36 of the front-rear chamber 34, and a through-hole 52 formed in the base fabric 42 of the airbag main body 40.

Figure 8:
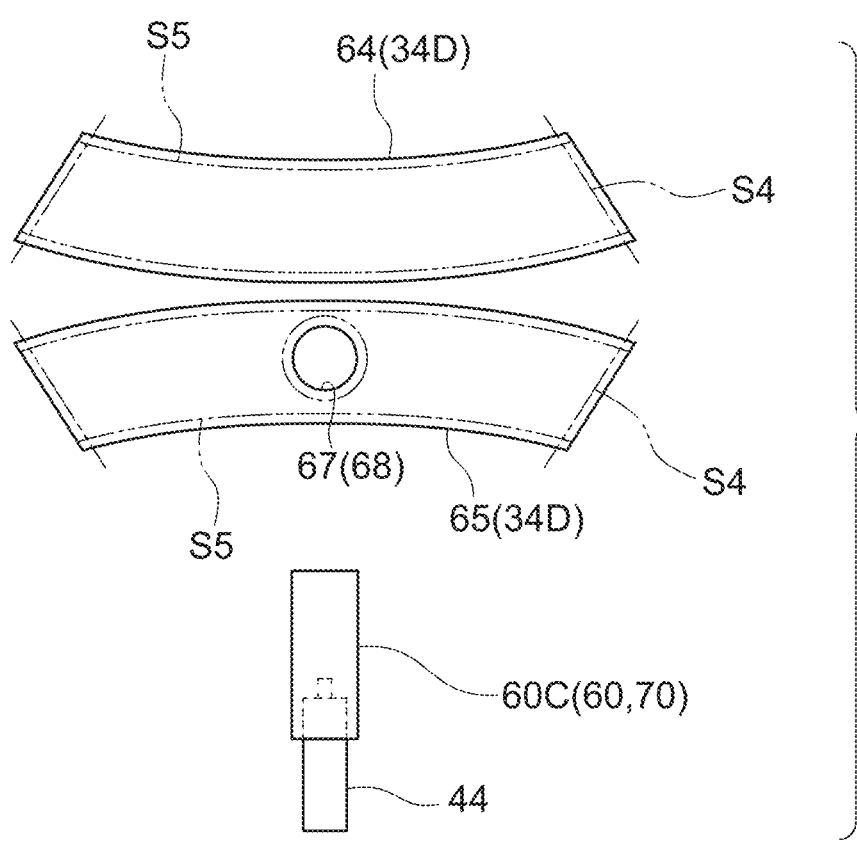
FIG. 8 is an expanded view of a region corresponding to a rear connecting portion of the front-rear chamber of the airbag.

As illustrated in FIG. 8, the rear connecting portion 34D is formed in the shape of an elongated tube due to two, elongated base fabrics 64, 65 being superposed together, and the transverse direction end portions thereof being sewn together at sewn portions S5. The rear connecting portion 34D is sewn to the rear end portions of the pair of front-rear extending portions 34A at sewn portions S4 that are provided at the length direction both end portions of the rear connecting portion 34D. As illustrated in FIG. 6, communication holes 66, which communicate the interior of the rear connecting portion 34D and the interiors of the pair of front-rear extending portions 34A, are formed at the inner sides of the sewn portions S4. The communication holes 66 are substantially circular as an example. The communication holes 66 are structured by through-holes 53 that are formed in the base fabric 36 of the front-rear chamber 34.

Further, the diffuser 70 that is tubular is connected to the length direction central portion of the rear connecting portion 34D. As an example, the diffuser 70 is manufactured from a metal pipe, and has a rectilinear section that is directed toward the rear connecting portion 34D. One length direction end portion of the diffuser 70 is connected to a communication hole 67 formed in the length direction central portion of the rear connecting portion 34D. The interior of the diffuser 70 and the interior of the rear connecting portion 34D communicate via the communication hole 67. The communication hole 67 is substantially circular as an example. The communication hole 67 is structured by a through-hole 68 that is formed in the base fabric 65 that structures the rear side surface of the rear connecting portion 34D.

The diffuser 70 that is structured as described above is disposed at the seat transverse direction center of the interior of the module case 46. The pair of inflator accommodating portions 34C are disposed at the left and right both sides of the diffuser 70. The diffuser 70 structures a gas supply path that is connected to the rear side surface of the rear connecting portion 34D.

Hereinafter, as needed, the gas supply path 60 that is structured by the diffuser 70 is called a third gas supply path 60C. The third gas supply path 60C structures a rectilinear flow path, and is provided so as to be directed toward the seat front side, in the same way as the above-described first gas supply path 60A and second gas supply path 60B. Further, in the state in which the third gas supply path 60C is accommodated within the module case 46, the third gas supply path 60C extends obliquely toward the seat front side and the seat upper side. The incidence angle θ1 of the third gas supply path 60C with respect to the ceiling 24 of the vehicle cabin R, in a side view seen from the seat transverse direction, is set to be an acute angle.

Further, in the present embodiment, in the state in which the third gas supply path 60C is accommodated within the module case 46, the third gas supply path 60C is disposed further toward the seat upper side than the first gas supply path 60A and the second gas supply path 60B. A gas jetting portion (not denoted by a reference numeral) of the inflator 44 is fixed to the length direction another end portion of the diffuser 70 that structures the third gas supply path 60C.

Due to a portion of or the entirety of the inflator 44 being inserted within the third gas supply path 60C, the inflator 44 is disposed so as to be directed toward the seat front side, and is disposed in a posture in which the axial direction thereof is inclined toward the seat upper side with respect to the seat front-rear direction. Namely, the inflator 44 is disposed in a posture in which, in a side view seen from the seat transverse direction, the incidence angle θ1 of the inflator 44 with respect to the ceiling 24 of the vehicle cabin R is set to be an acute angle that is similar to that of the third gas supply path 60C. Stud bolts are provided at the inflator 44 as a pair at the both end portions in the axial direction for example. The pair of stud bolts passes through the diffuser 70, the module case 46, and an unillustrated bracket supported at the frame of the seatback 16, and nuts are screwed-together with these stud bolts. Due thereto, the diffuser 70, the inflator 44 and the module case 46 are fixed to the frame of the seatback 16.

At usual times, the pair of front-rear extending portions 34A, the front connecting portion 34B, the rear connecting portion 34D and the airbag main body 40 are folded-up by a predetermined way of folding such as folding in the form of a roll, folding in the form of bellows, or the like, and are accommodated within the module case 46. Further, in the state in which the rear connecting portion 34D is accommodated within the module case 46, i.e., in the state before gas is supplied thereto from the inflator 44, the rear connecting portion 34D is accommodated at the seat rear side of the airbag main body 40 (see FIG. 9). Further, the diffuser 70 that structures the third gas supply path 60C is accommodated at the seat rear side of the airbag main body 40, via the rear connecting portion 34D.

When the plural (three in the present embodiment) inflators 44 operate, gas is generated at the interiors of the first gas supply path 60A, the second gas supply path 60B, and the third gas supply path 60C. The gas generated within the first gas supply path 60A and the second gas supply path 60B passes through the pair of inflator accommodating portions 34C and the pair of front-rear extending portions 34A and flows toward the front connecting portion 34B side, and passes through the communication hole 48 and is supplied to the interior of the airbag main body 40. Due thereto, the airbag 32 inflates and expands in the order of the pair of front-rear extending portions 34A, the front connecting portion 34B and the airbag main body 40.

On the other hand, the gas generated within the third gas supply path 60C passes through the communication hole 67 and inflates the rear connecting portion 34D, and thereafter, passes through the pair of front-rear extending portions 34A and flows toward the front connecting portion 34B side, and passes through the communication hole 48 and is supplied to the interior of the airbag main body 40. Due thereto, the gas supplied from the third gas supply path 60C is supplied to the interior of the airbag 32 in the order of the rear connecting portion 34D, the pair of front-rear extending portions 34A, the front connecting portion 34B and the airbag main body 40, and assists the inflation and expansion of the airbag 32.

At the time of inflation and expansion of the airbag 32, unillustrated tear lines formed in the module case 46 receive the inflation pressure of the airbag 32 and rupture. Due thereto, the airbag 32 can inflate and expand toward the outer side of the module case 46.

Figure 9:
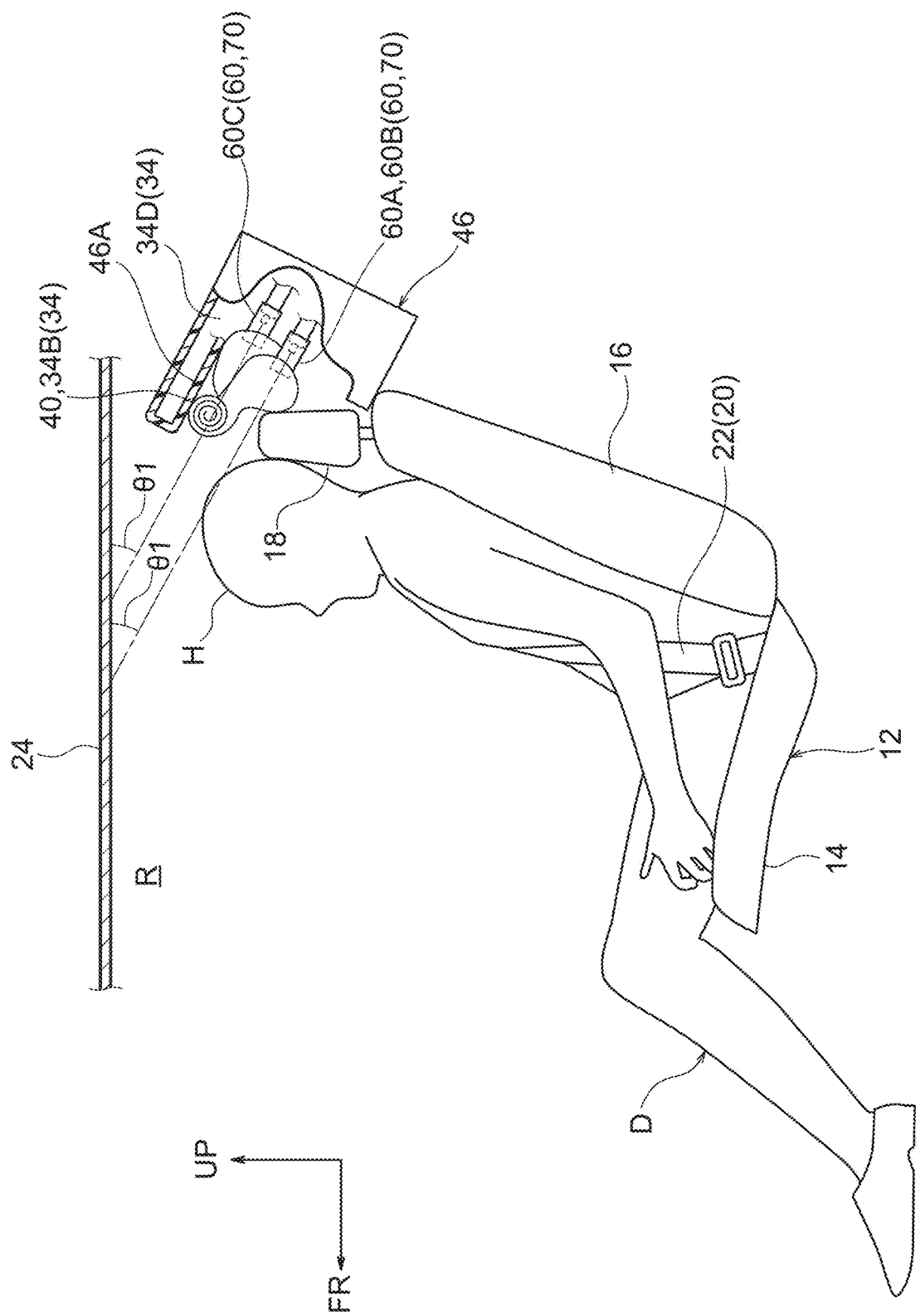
FIG. 9 is a side view illustrating a state in an initial stage of inflation and expansion of the airbag.
Figure 10:
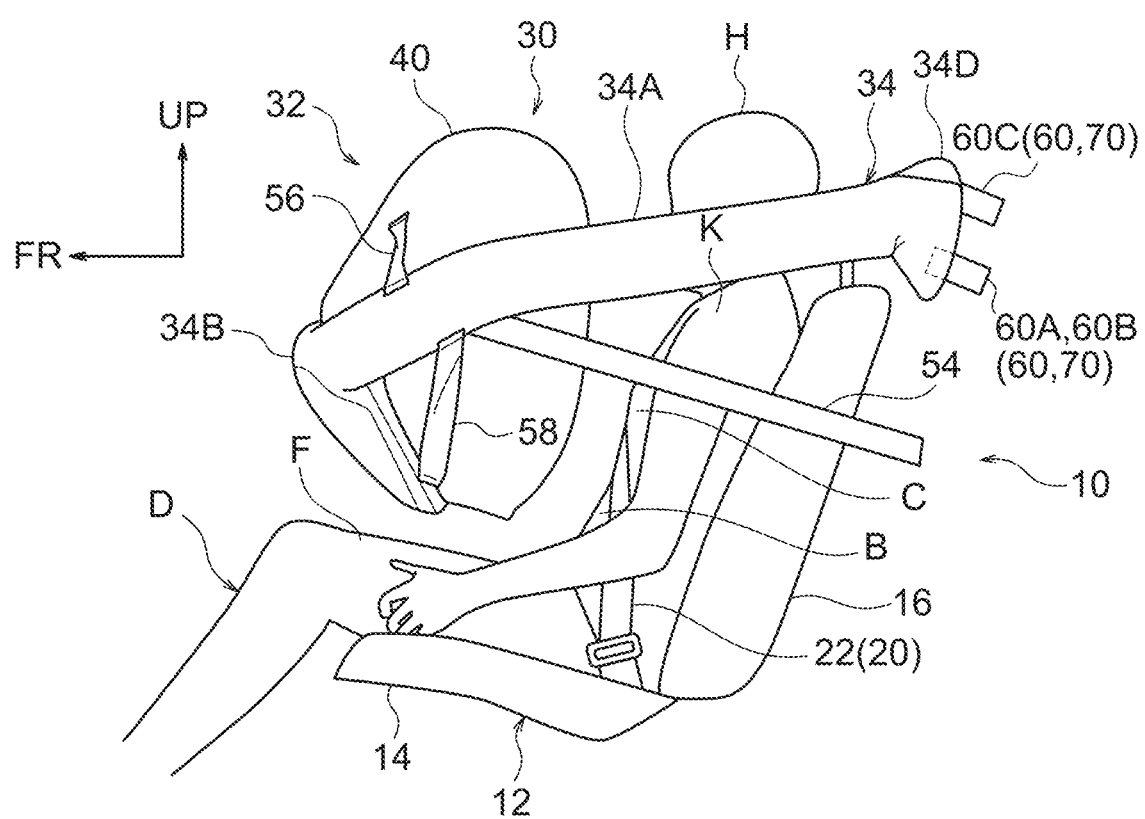
FIG. 10 is a side view illustrating a state immediately after inflation and expansion of the airbag are completed.

Here, as illustrated in FIG. 9, a guide portion 46A, which extends further toward the seat front side and upper side than the first gas supply path 60A, the second gas supply path 60B, and the third gas supply path 60C of the airbag 32, is provided integrally with the upper portion of the module case 46. The guide portion 46A forms a guide surface whose incidence angle θ1 with respect to the ceiling 24 of the vehicle cabin R, in a side view seen from the seat transverse direction, is set to be an acute angle. At the time when the airbag 32 inflates and expands toward the outer side of the module case 46, the guide portion 46A guides the seat front side and upper side expansion directions, and can improve the robustness. Note that the module case 46 may be structured integrally with the backboard that structures the back surface of the seatback 16.

As illustrated in FIG. 9, in the initial stage of inflation and expansion of the airbag 32, the airbag 32 receives a supply of gas from the first gas supply path 60A and the second gas supply path 60B, and the pair of front-rear extending portions 34A of the front-rear chamber 34 inflate and expand toward the seat front side and upper side. At this time, the expanding directions of the pair of front-rear extending portions 34A are directions that form an acute angle with respect to the ceiling 24 of the vehicle cabin R. Further, at this time, the expansion directions of the pair of front-rear extending portions 34A are directions that are inclined toward the seat transverse direction outer sides with respect to the seat front-rear direction, as seen in a plan view.

On the other hand, the airbag 32 receives a supply of gas from the third gas supply path 60C, and the rear connecting portion 34D of the front-rear chamber 34 inflates and expands toward the seat front side and upper side. Due thereto, simultaneously with the expansion of the pair of front-rear extending portions 34A, the front connecting portion 34B and the airbag main body 40, which are accommodated at the seat front side of the rear connecting portion 34D, are pushed-out toward the seat front side and upper side by the inflation pressure of the rear connecting portion 34D.

The pair of front-rear extending portions 34A which have inflated and expanded extend in the front-rear direction at the left and right both sides of the head H of the passenger D, and face the head H from the left and right both sides with gaps between the front-rear extending portions 34A and the head H, respectively. Due to the operation of this pair of front-rear extending portions 34A, the front connecting portion 34B and the airbag main body 40 slip-through the gap between the head H of the passenger D and the ceiling 24 of the vehicle cabin R from the rear side toward the front side, and complete inflation and expansion at the seat front side of the passenger D.

Note that, due to the pair of front-rear extending portions 34A being pulled-in obliquely rearward and downward by a pair of left and right rear tethers 54 that are described later, the pair of front-rear extending portions 34A are in postures of being inclined downward while heading forward. The front end portions of the pair of front-rear extending portions 34A that have inflated and expanded are in a state of being connected in the left-right direction by the front connecting portion 34B that has inflated and expanded. As illustrated in FIG. 3, the front-rear chamber 34, which includes the pair of front-rear extending portions 34A, the front connecting portion 34B and the rear connecting portion 34D, inflates and expands in the shape of a loop as seen in a plan view. The U-shaped portion, which is formed by the pair of front-rear extending portions 34A and the front connecting portion 34B and opens rearward as seen in a plan view, inflates and expands at the seat front side of the headrest 18.

To describe this more concretely, as illustrated in FIG. 1, FIG. 2, FIG. 4 and FIG. 5, an enlarged portion 34B1, whose dimension in the vertical direction is larger than that of the left and right both end portions of the front connecting portion 34B, is provided at the left-right direction central portion of the front connecting portion 34B that has inflated and expanded. This enlarged portion 34B1 protrudes-out further toward the lower side than the left and right both end portions of the front connecting portion 34B. The aforementioned communication hole 48 is formed in the enlarged portion 34B1. The communication hole 48 is positioned at the rear side of the left-right direction central portion of the front connecting portion 34B that has inflated and expanded. The gas from the inflators 44 passes through the communication hole 48 and is supplied rearward into the interior of the airbag main body 40. Due thereto, the airbag main body 40 inflates and expands at the rear of the front connecting portion 34B toward the passenger D side (the rear side), later than the front-rear chamber 34. Due to the inflation and expansion of the front-rear chamber 34, this airbag main body 40 passes through the gap between the head H of the passenger D and the ceiling 24 of the vehicle cabin R from the rear side toward the front side, and thereafter, inflates and expands toward the rear side.

The airbag main body 40 that has inflated and expanded faces the head H, chest region C and abdomen B of the passenger D from the front side with a gap therebetween.

Figure 11:
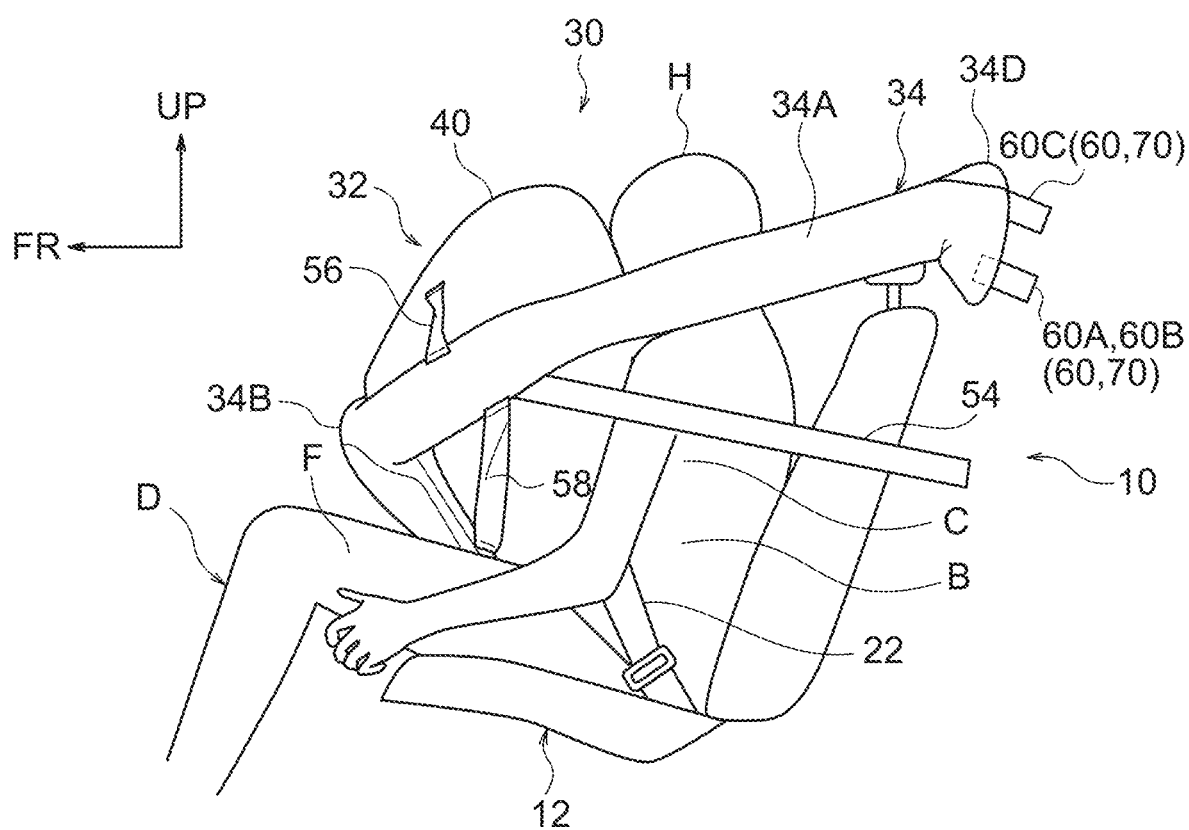
FIG. 11 is a side view illustrating a state in an initial stage of restraining a passenger by the airbag.
Figure 12:
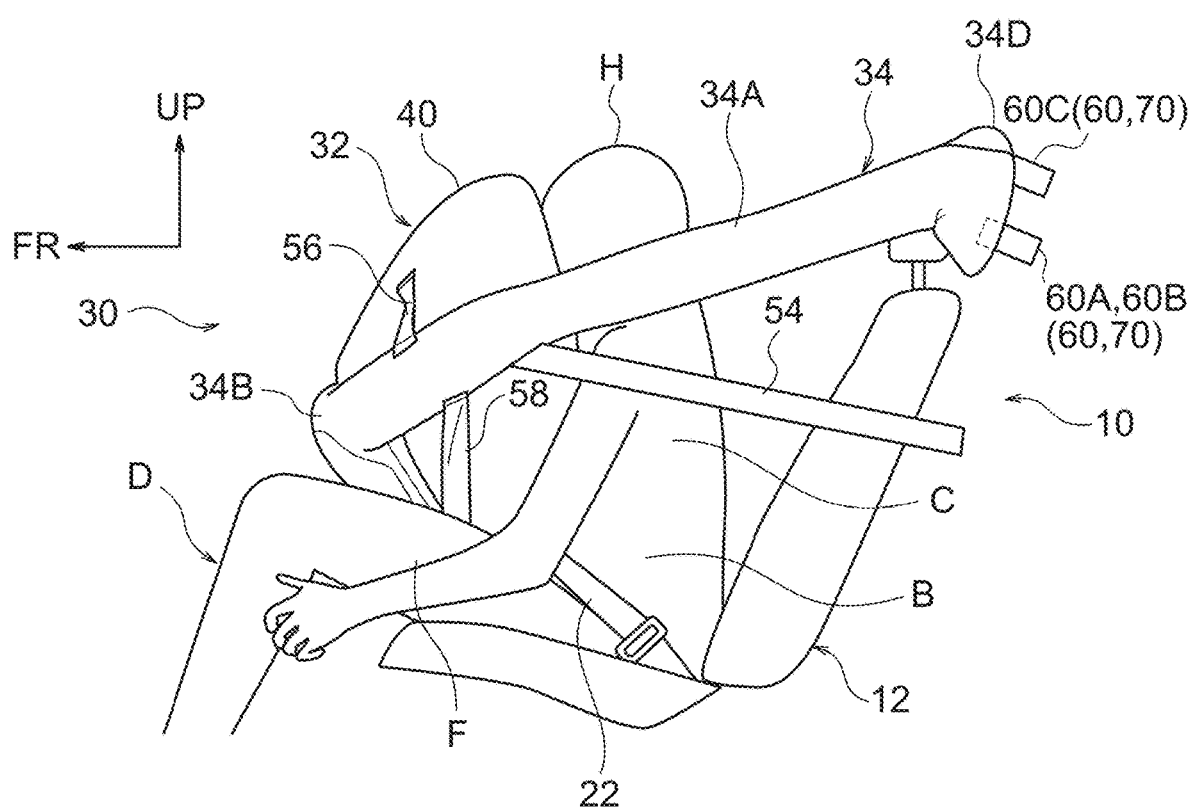
FIG. 12 is a side view illustrating a state in an intermediate stage of restraining the passenger by the airbag.
Figure 13:
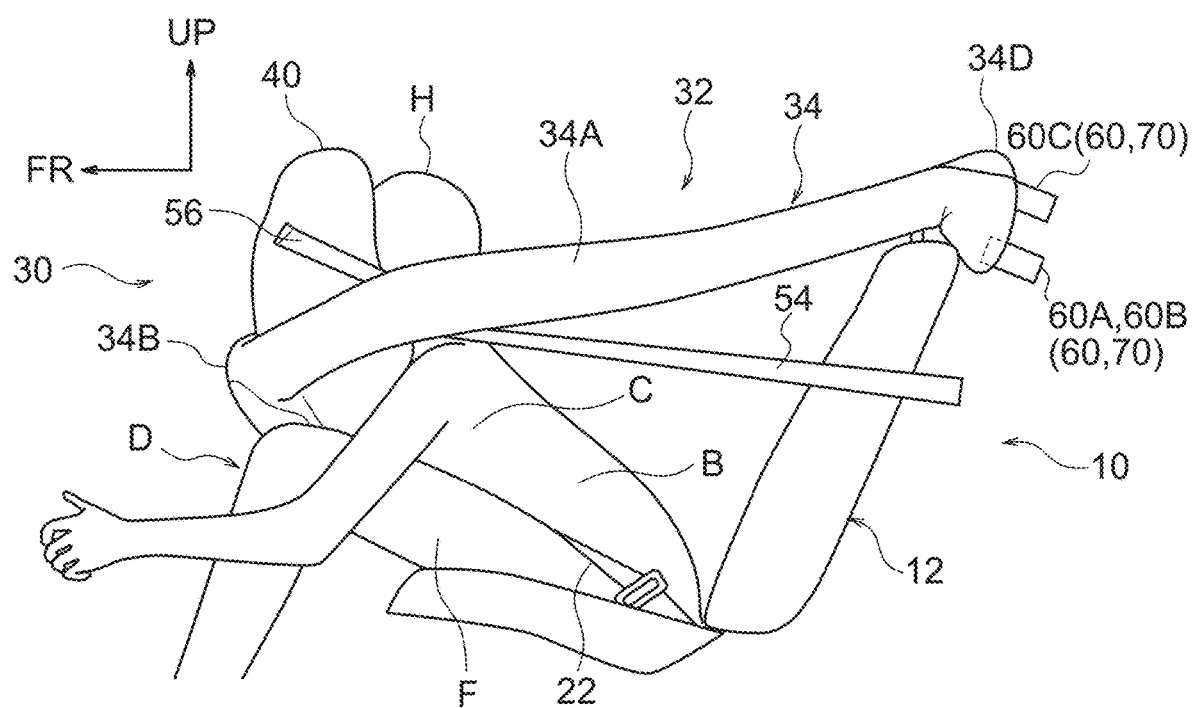
FIG. 13 is a side view illustrating a state in a latter stage of restraining the passenger by the airbag.
Figure 14:
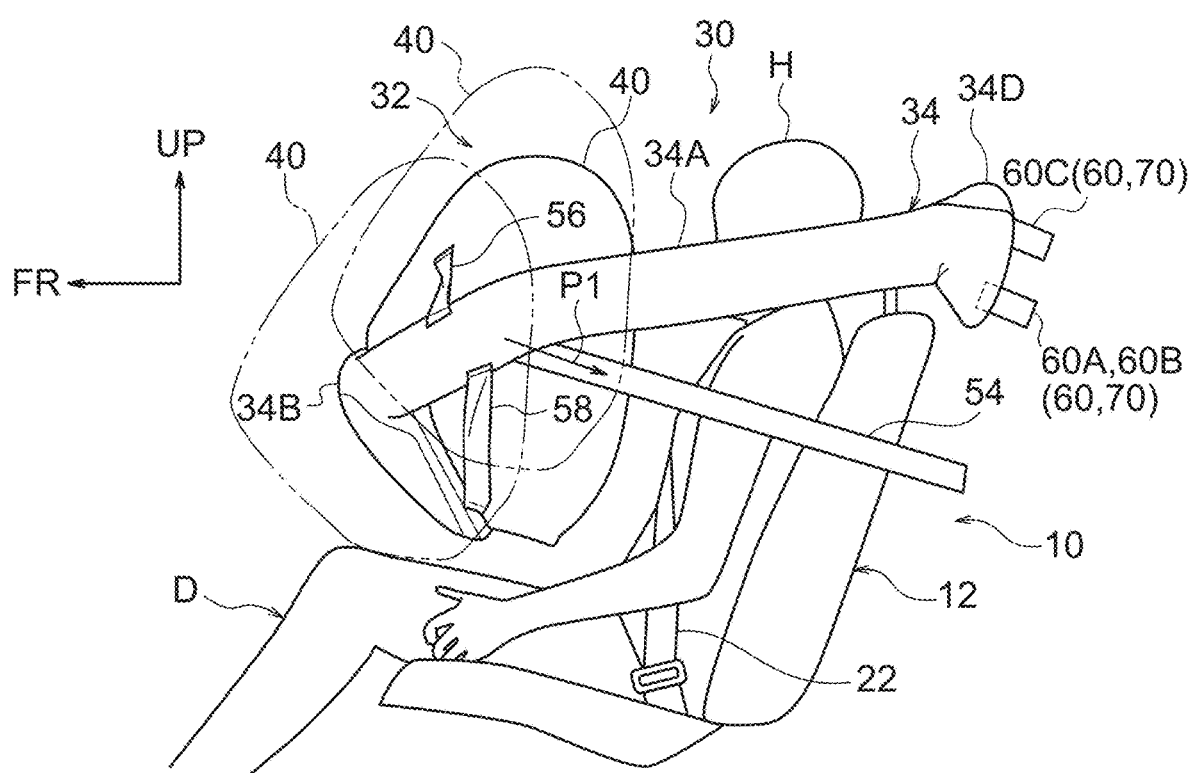
FIG. 14 is a side view for explaining effects of suppressing swaying of the airbag by rear tethers.

As illustrated in FIG. 11 through FIG. 13, the airbag main body 40 that has inflated and expanded restrains, from the front side, the passenger D who inertially moves forward due to the impact of a vehicle collision. At the time of restraining the passenger, the front-rear chamber 34 is stretched in the front-rear direction, and the airbag main body 40 is compressed in the front-rear direction. As illustrated in FIG. 12 and FIG. 13, the shape of the airbag main body 40 is set such that, from the intermediate stage through the latter stage of the time of restraining the passenger, the airbag main body 40 is sandwiched between femoral region F and the chest region C of the passenger D.

The left and right pair of rear tethers 54, a left and right pair of front upper tethers 56, and a left and right pair of front lower tethers 58 are attached to the airbag 32 that has the above-described structure. The rear tethers 54, the front upper tethers 56 and the front lower tethers 58 are structured in the shapes of elongated strips by fabric materials of nylon or polyester for example. The fabric materials that structure the rear tethers 54, the front upper tethers 56 and the front lower tethers 58 are structured so as to be harder to stretch than the base fabrics 36, 38 that structure the front-rear chamber 34 and the base fabric 42 that structures the airbag main body 40. This difficulty of stretching can be adjusted by the material, the thickness or the like of the fabric.

Respective one end portions of the pair of rear tethers 54 are attached (sewn) to respective length direction intermediate portions of the pair of front-rear extending portions 34A (in detail, the front portions of the respective front-rear extending portions 34A that have inflated and expanded). The respective another end portions of the pair of rear tethers 54 are respectively attached to the seatback 16 or the unillustrated vehicle body, further toward the rear side than the passenger D. In the state in which the airbag 32 has inflated and expanded, the pair of rear tethers 54 extend in the front-rear direction beneath the pair of front-rear extending portions 34A. In this state, the pair of rear tethers 54 are in postures of being inclined downward while heading rearward. Due thereto, the pair of front-rear extending portions 34A are pulled-in obliquely rearward and downward by the pair of rear tethers 54 (refer to arrow P1 in FIG. 14). Due thereto, at the time of completion of the inflation and expansion of the airbag 32, the airbag 32 swaying in the vertical direction and the front-rear direction is suppressed (refer to the airbag 32 illustrated by the two-dot chain line in FIG. 14).

Figure 15:
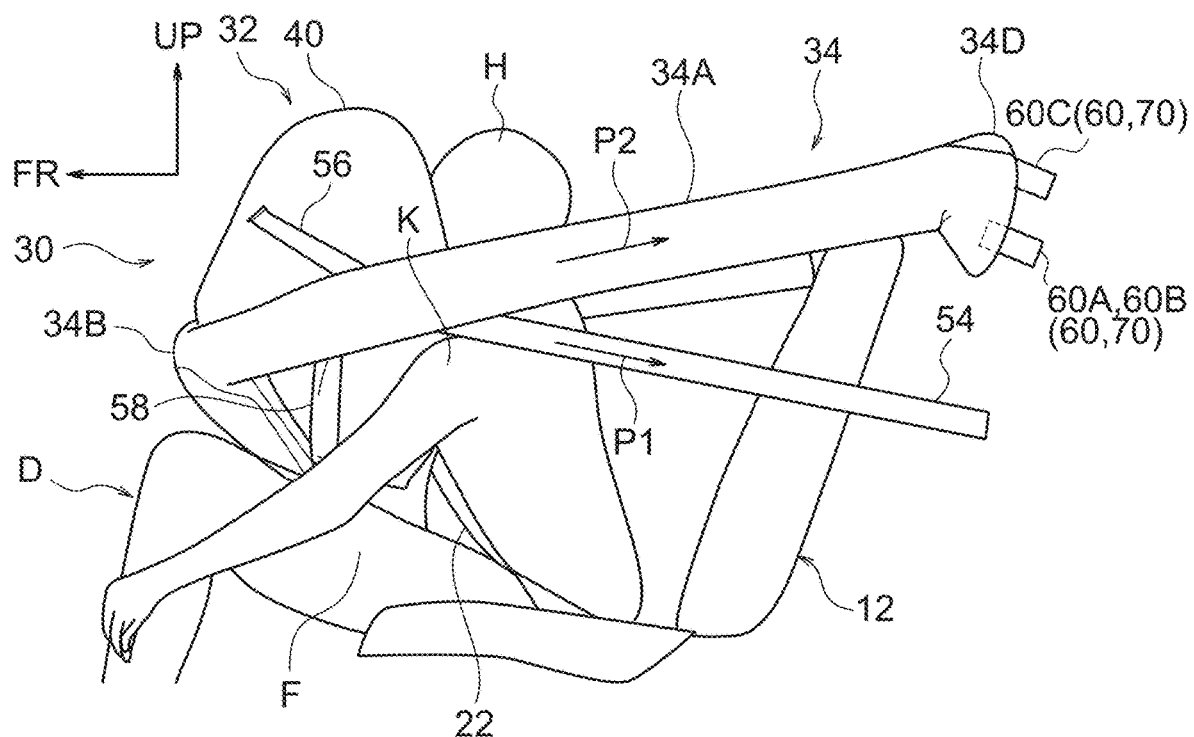
FIG. 15 is a side view for explaining abutting of the shoulders of the passenger by the front-rear chamber.
Figure 16:
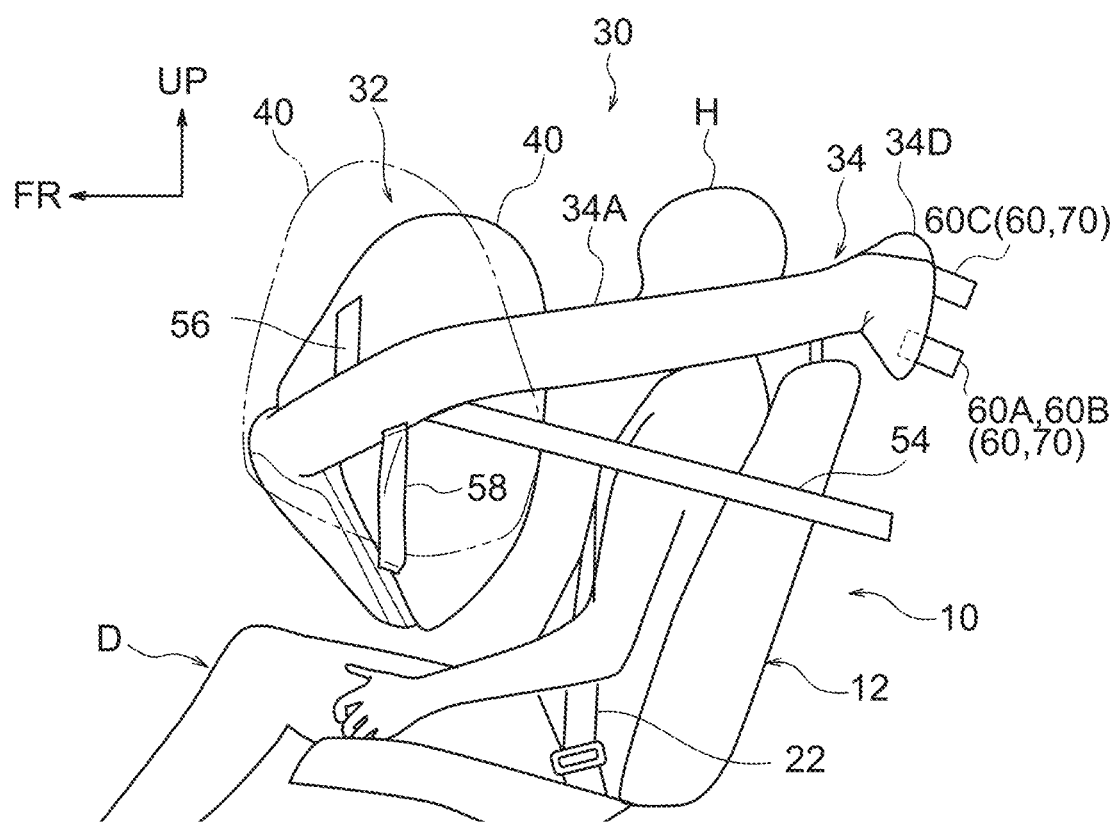
FIG. 16 is a side view for explaining effects of suppressing swaying of the airbag by front upper tethers.
Figure 17:
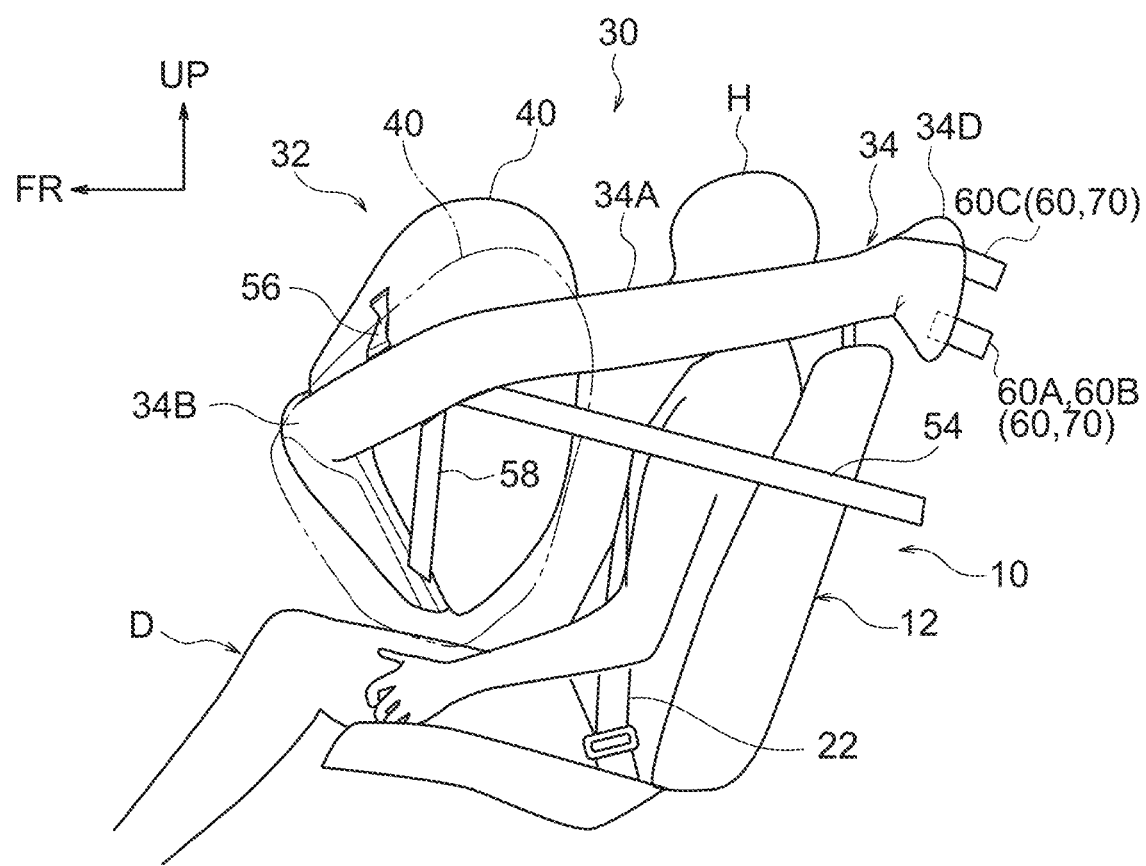
FIG. 17 is a side view for explaining effects of suppressing swaying of the airbag by front lower tethers.

Due to the pair of front-rear extending portions 34A being pulled-in as described above, at the time when the passenger is restrained by the airbag 32, the bottom surfaces of the pair of front-rear extending portions 34A abut left and right shoulders K of the passenger (see FIG. 15). At this time of restraining the passenger by the airbag 32, the airbag main body 40 is supported (refer to arrow P1 and arrow P2 in FIG. 15) by the tensile loads of the pair of front-rear extending portions 34A and the pair of rear tethers 54. Note that, although the passenger D is an AM50 in the present embodiment, the length of the pair of rear tethers 54 is set such that the bottom surfaces of the pair of front-rear extending portions 34A abut the left and right shoulders K of the passenger D even in a case in which the passenger D is an AM95 (95th percentile U.S. adult male) or the passenger D is an AF05 (5th percentile U.S. adult female).

The pair of front upper tethers 56 connect the front portions of the pair of front-rear extending portions 34A, and the left and right both side regions at the front portion of the upper portion, which inflates and expands at further toward the upper side than the front-rear chamber 34, of the airbag main body 40. Respective one end portions of the pair of front upper tethers 56 are respectively sewn to the left and right both side regions at the front portion of the upper portion, which inflates and expands at further toward the upper side than the front-rear chamber 34, of the airbag main body 40. Respective another end portions of the pair of front upper tethers 56 are respectively sewn to the front portions of the pair of front-rear extending portions 34A. At the time of completion of the inflation and expansion of the airbag 32, the pair of front upper tethers 56 suppress upward rotation of the airbag main body 40 around the front connecting portion 34B (refer to the airbag main body 40 illustrated by the two-dot chain line in FIG. 16).

The pair of front lower tethers 58 connect the front portions of the pair of front-rear extending portions 34A, and the left and right both side regions at the lower portion, which inflates and expands at further toward the lower side than the front-rear chamber 34, of the airbag main body 40. Respective one end portions of the pair of front lower tethers 58 are respectively sewn to the left and right both side regions at the lower portion, which inflates and expands at further toward the lower side than the front-rear chamber 34, of the airbag main body 40. Respective another end portions of the pair of front lower tethers 58 are respectively sewn to the front portions of the pair of front-rear extending portions 34A. At the time of completion of the inflation and expansion of the airbag 32, the pair of front lower tethers 58 suppress downward rotation of the airbag main body 40 around the front connecting portion 34B (refer to the airbag main body 40 illustrated by the two-dot chain line in FIG. 17).

Figure 18:
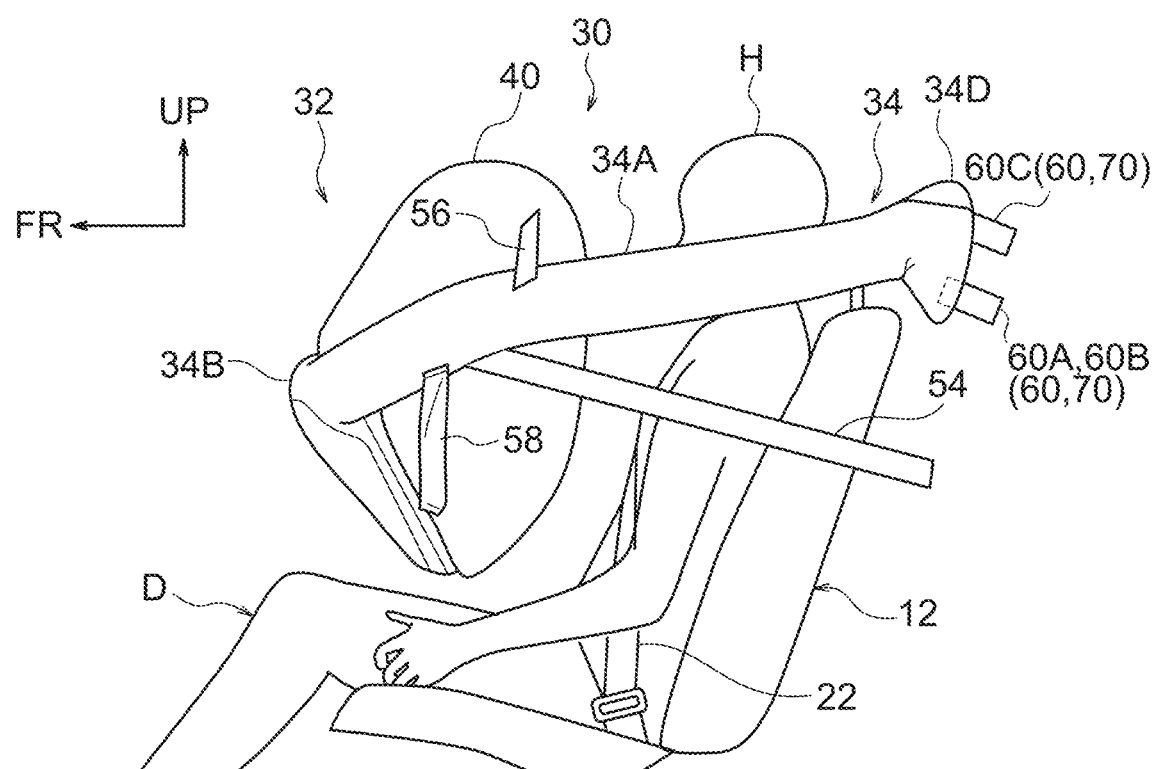
FIG. 18 is a side view illustrating an example in which attached positions of the front upper tethers are inadequate, and is a drawing illustrating a state immediately before restraining of the passenger by the airbag.
Figure 19:
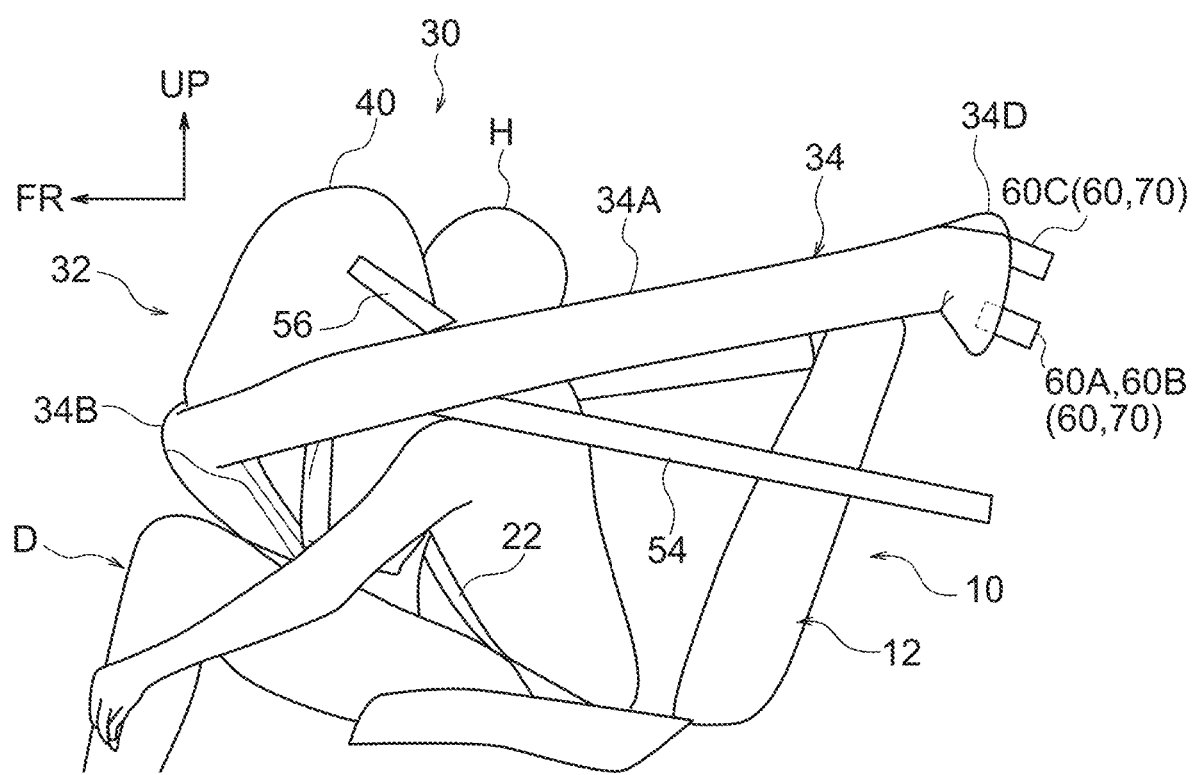
FIG. 19 is a side view illustrating an example in which attached positions of the front upper tethers are inadequate, and is a drawing illustrating a state in the latter stage of restraining of the passenger by the airbag.

Note that the following problem arises in a case in which the respective one end portions of the pair of front upper tethers 56 are respectively sewn to the left and right both side regions at the rear portion of the upper portion, which has inflated and expanded further toward the upper side than the front-rear chamber 34, of the airbag main body 40 as illustrated in FIG. 18. Namely, as illustrated in FIG. 19, at the time when the passenger is restrained by the airbag 32, compressive deformation of the airbag main body 40 is impeded due to the pair of front upper tethers 56 being stretched taut. Therefore, the respective one end portions of the pair of front upper tethers 56 must be sewn respectively to the left and right both side regions at the front portion of the upper portion, which inflates and expands at further toward the upper side than the front-rear chamber 34, of the airbag main body 40.

The above-described airbag device 30 has an unillustrated control device (ECU) that controls operation of the inflators 44. The control device is electrically connected to the inflators 44 and to an unillustrated collision sensor. On the basis of information from the collision sensor, the control device can sense or predict, for each type of collision described hereinafter, the occurrence of a front collision of any of various types (or the fact that a front collision is inevitable) at the automobile to which the airbag device 30 is applied.

When the control device senses or predicts a front collision on the basis of information from the collision sensor, the control device causes the respective inflators 44 to operate. Note that, in addition to full-overlap front collisions, offset front collisions such as oblique collisions and small overlap collisions and the like are included among the types of front collisions in which the control device causes the inflators 44 to operate.

(Operation and Effects)

Operation and effects of the first embodiment are described next.

The passenger protecting device 10 relating to the present embodiment has the vehicle seat 12 in which the passenger D of the automobile sits, and the airbag device 30 that protects the passenger D at the time of a collision of the vehicle. At this airbag device 30, at the time of a collision of the vehicle, gas generated from the respective inflators 44 is supplied to the airbag 32. Due thereto, the airbag 32 inflates and expands from the seat rear side of the upper portion of the vehicle seat toward the front side, and slips-through between the ceiling 24 of the vehicle cabin R and the head H of the passenger D.

Here, the airbag 32 has the at least one gas supply path 60 that is provided so as to be directed toward the seat front side. The incidence angle θ1 of the gas supply paths 60 with respect to the ceiling, in a side view seen from the seat transverse direction, is set to be an acute angle. Due thereto, because the airbag 32 is expanded in a direction that forms an acute angle with respect to the ceiling 24 of the vehicle cabin R as seen in a side view, the airbag 32 catching on the ceiling 24 is suppressed. Further, because the airbag 32 is expanded toward an obliquely upper side from the seat rear side of the headrest 18, the airbag 32 interfering with the head H of the passenger D at the upper side of the headrest 18 also is suppressed. Due thereto, the expansion performance of the airbag 32, which inflates and expands toward the seat front side from the seat rear side of the upper portion of the vehicle seat, can be improved.

Note that the incidence angle θ1 of the gas supply paths 60 with respect to the ceiling 24 of the vehicle cabin R can be set to be an acute angle in the range of 15°~35°, and is more preferably set to be 25°.

The airbag 32 of the present embodiment has the front-rear chamber 34 and the airbag main body 40. The front-rear chamber 34 passes the left and right both sides of the head H of the passenger D seated in the vehicle seat, and the left and right pair of front-rear extending portions 34A inflate and expand toward the seat front side. Then, the front connecting portion 34B, which connects the front end portions of the pair of front-rear extending portions 34A in the seat transverse direction, slips-through between the ceiling 24 of the vehicle cabin R and the head H of the passenger D, and is disposed at the front side of the passenger D. Thereafter, at the seat rear side of the front connecting portion 34B, the airbag main body 40 inflates and expands toward the passenger D side later than the front-rear chamber 34. Due thereto, at the airbag 32, when gas is supplied from the gas supply paths 60, the left and right pair of front-rear extending portions 34A are expanded in a direction forming an acute angle with respect to the ceiling. Therefore, the front connecting portion 34B and the airbag main body 40 catching on the ceiling 24 of the vehicle cabin R is suppressed. Further, because the front connecting portion 34B and the airbag main body 40 are expanded from the headrest 18 toward an obliquely upper side, interference with the head H of the passenger D at the upper side of the headrest 18 also is suppressed.

Further, at the time of restraining the passenger D, the airbag main body 40 is compressed in the seat front-rear direction while stretching the front-rear chamber 34 in the seat front-rear direction. Due to this compressive deformation of the airbag main body 40, the energy absorbing performance of the airbag 32 can be improved.

Further, in the present embodiment, the first gas supply path 60A and the second gas supply path 60B that are provided at the rear end portions of the pair of front-rear extending portions are included as the gas supply paths 60. The first gas supply path 60A and the second gas supply path 60B are inclined toward the seat transverse direction outer sides so as to be at the predetermined inclination angle θ2 with respect to the seat front-rear direction as seen in a plan view. Therefore, at the airbag 32, when gas is supplied from the first gas supply path 60A and the second gas supply path 60B, the pair of front-rear extending portions 34A pass the left and right both sides of the head H of the passenger D and inflate and expand obliquely toward the seat front side and the seat transverse direction outer sides. Due thereto, even in a case in which the position of the head H of the passenger D is offset in the seat transverse direction such as, for example, a case in which the passenger D is sleeping with his/her head leaning against the window, or the like, interference between the pair of front-rear extending portions 34A and the head H of the passenger D at the sides of the headrest 18 is suppressed.

The inclination angle θ2 of the first gas supply path 60A and the second gas supply path 60B with respect to the seat front-rear direction can be set within the range of 10°~45°, and is more preferably set to be 15°.

In the present embodiment, the front-rear chamber 34 has the rear connecting portion 34D that connects the rear end portions of the pair of front-rear extending portions 34A in the seat transverse direction. In the state before gas is supplied, the rear connecting portion 34D is accommodated at the seat rear side of the airbag main body 40. Due thereto, when gas is supplied from the gas supply paths 60, the rear connecting portion 34D inflates at the seat rear side of the airbag main body 40, and can push the airbag main body 40 out toward the seat front side. As a result, the robustness of the airbag main body 40 at the time of inflation and expansion improves, and the behavior at the time of slipping-through between the ceiling 24 of the vehicle cabin R and the head H of the passenger D can be stabilized.

Further, in the present embodiment, the third gas supply path 60C that is connected to the rear side surface of the rear connecting portion 34D is included as the gas supply path 60. Due thereto, through the third gas supply path 60C, the rear connecting portion 34D can be rapidly inflated and expanded toward the seat front side. Due thereto, in the initial stage of inflation and expansion, the airbag main body 40 is pushed-out in a direction that forms an acute angle with respect to the ceiling 24 of the vehicle cabin R, and the behavior at the time when the airbag main body 40 slips-through between the ceiling 24 of the vehicle cabin R and the head H of the passenger D can be stabilized even more.

Further, in the present embodiment, after the inflation and expansion of the front-rear chamber 34, the airbag main body 40 inflates and expands toward the passenger D side (i.e., the rear side) at the rear side of the front connecting portion 34B. Due thereto, the gap between the airbag main body 40 and the passenger D becomes small. As a result, the passenger D is restrained by the airbag main body 40 at an early stage, and therefore, the performance of restraining the passenger D at an early stage by the airbag main body 40 can be improved.

Further, in the present embodiment, gas from the inflators 44 is supplied to the airbag main body 40 via the communication hole 48 that is positioned at the rear side of the left-right direction central portion of the front connecting portion 34B of the front-rear chamber 34 in the state in which the front-rear chamber 34 has inflated and expanded. Namely, the gas, which has passed through the pair of front-rear extending portions 34A and the front connecting portion 34B of the front-rear chamber 34, is supplied rearward from the above-described communication hole 48 into the airbag main body 40. Due thereto, the airbag main body 40 can be inflated and expanded sufficiently later than the front-rear chamber 34. As a result, for example, it is easy to cause the airbag 32 to pass through the narrow gap between the head H of the passenger D and the ceiling 24 of the vehicle cabin R and to inflate and expand the airbag 32.

Namely, in the present embodiment, due to the inflation and expansion of the front-rear chamber 34, the airbag main body 40 passes from the rear side toward the front side through the gap between the head H of the passenger D and the ceiling 24 of the vehicle cabin R, and thereafter, inflates and expands toward the rear side. Due thereto, it is easy to prevent the airbag main body 40 from becoming stuck in this gap, and it is easy to prevent poor expansion of the airbag.

Figure 20:
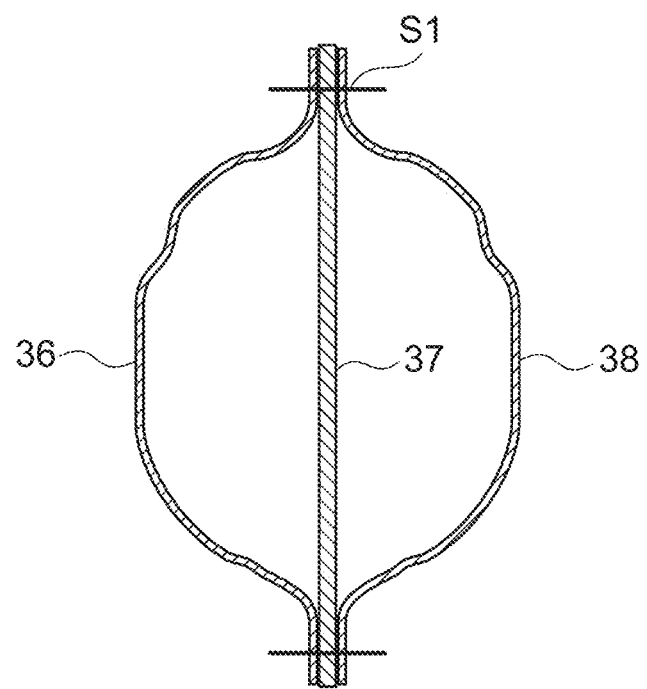
FIG. 20 is a cross-sectional view illustrating, in an enlarged manner, an example in which some of plural base fabrics that structure the front-rear chamber are hard-to-stretch base fabrics.

Further, in the present embodiment, the base fabrics 36, 38 that structure the front-rear chamber 34 include base fabric(s) that are harder to stretch than the base fabric 42 that structures the airbag main body 40. Specifically, the front-rear chamber 34 is a structure in which the two base fabrics 36, 38 are superposed on one another and the peripheral edge portions thereof are sewn together. One or both of the two base fabrics 36, 38 is the above-described hard-to-stretch base fabric. Note that, as illustrated in FIG. 20, there may be a structure in which a base fabric 37 that is harder to stretch than the base fabric of the airbag main body 40 is disposed between the two base fabrics 36, 38. In the structure illustrated in FIG. 20, the two base fabrics 36, 38 have the same difficulty of stretching as that of the base fabric 42 structuring the airbag main body 40.

Figure 21:
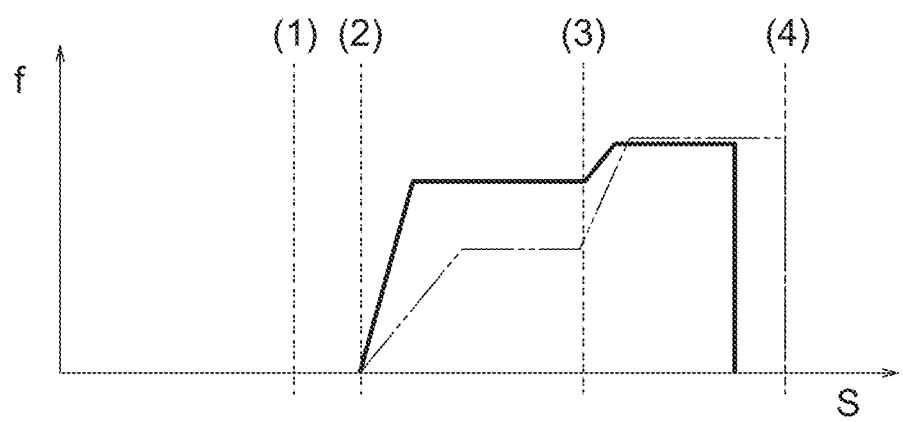
FIG. 21 is a graph illustrating the relationship between load applied to the chest region of the passenger and displacement of the chest region.

By structuring the front-rear chamber 34 as described above, the amount of energy absorbed due to the stretching of the front-rear chamber 34 in the front-rear direction can be improved, as illustrated by the graphed solid line in FIG. 21. Note that, in FIG. 21, the vertical axis f shows the load that is applied from the airbag main body 40 to the chest region C of the passenger D, and the horizontal axis S shows the displacement of the chest region C of the passenger D. In this FIG. 21, a case in which the base fabrics that structure the front-rear chamber 34 have the same difficulty of stretching as the base fabric structuring the airbag main body 40 is illustrated by the graphed two-dot chain line. By employing a structure such as that of the present embodiment, the amount of energy that is absorbed improves particularly in the segment from (2) to (3) of FIG. 21. Note that, in the case of a structure in which the front-rear chamber 34 does not have the base fabric 37, the number of base fabrics and the volume of the airbag 32 in the folded-up state can be made to be less than those of the structure illustrated in FIG. 20. In the present embodiment, because the front-rear chamber 34 and the airbag main body 40 are manufactured from separate base fabrics, the difficulty of stretching of the base fabrics of the front-rear chamber 34 can be made to differ from that of the base fabric of the airbag main body 40.

Further, in the present embodiment, the shape of the airbag main body 40 is set such that the airbag main body 40 is sandwiched between the femoral region F and the chest region C of the passenger D, from the intermediate stage through the latter stage of the time of restraining the passenger by the airbag 32. Due thereto, the upper body of the passenger D can be made to contact the airbag main body 40 over a wide surface area, and therefore, the load applied from the airbag main body 40 to the passenger D can be reduced well.

Further, in accordance with the present embodiment, at the time when the passenger D is restrained by the airbag 32, the pair of rear tethers 54, whose respective one end portions are sewn to the pair of front-rear extending portions 34A of the front-rear chamber 34 and whose respective another end portions are attached to the seatback 16 or to the vehicle body at further toward the seat rear side than the passenger D, pull the pair of front-rear extending portions 34A in toward obliquely rearward and downward sides of the seat. The pair of rear tethers 54 are stretched in the front-rear direction together with the front-rear chamber 34 at the time when the passenger is restrained by the airbag main body 40. These rear tethers 54, together with the front-rear chamber 34, receive and support the load that is applied from the passenger D to the airbag main body 40.

Moreover, due to the above-described pulling-in by the pair of rear tethers 54, swaying of the airbag 32 in the vertical direction and the front-rear direction at the time when inflation and expansion are completed can be suppressed. Moreover, due to the above-described pulling-in by the pair of rear tethers 54, the lower surfaces of the pair of front-rear extending portions 34A abut the left and right shoulders K of the passenger D. Due thereto, the vertical direction position of the airbag main body 40 with respect to the head H of the passenger D can be stabilized, regardless of differences in physiques of the passengers D.

In the present embodiment, the front portion of the upper portion, which inflates and expands at further toward the upper side than the front-rear chamber 34, of the airbag main body 40, and the pair of front-rear extending portions 34A of the front-rear chamber 34, are connected by the pair of front upper tethers 56, respectively. Due thereto, the airbag main body 40, which has inflated and expanded, being displaced (rotating) inadvertently toward the upper side around the front connecting portion 34B with respect to the front-rear chamber can be suppressed.

Moreover, in the present embodiment, the lower portion, which inflates and expands at further toward the lower side than the front-rear chamber 34, of the airbag main body 40, and the pair of front-rear extending portions 34A of the front-rear chamber 34, are connected by the pair of front lower tethers 58, respectively. Due thereto, the airbag main body 40, which has inflated and expanded, being displaced (rotating) inadvertently toward the lower side around the front connecting portion 34B with respect to the front-rear chamber 34 can be suppressed.

Modified Example

An embodiment of the present disclosure has been described above, but the present disclosure can be implemented by being modified in various ways within a scope that does not depart from the gist thereof. The scope of the right of the present disclosure is, of course, not limited by the above-described embodiment.

Figure 22:
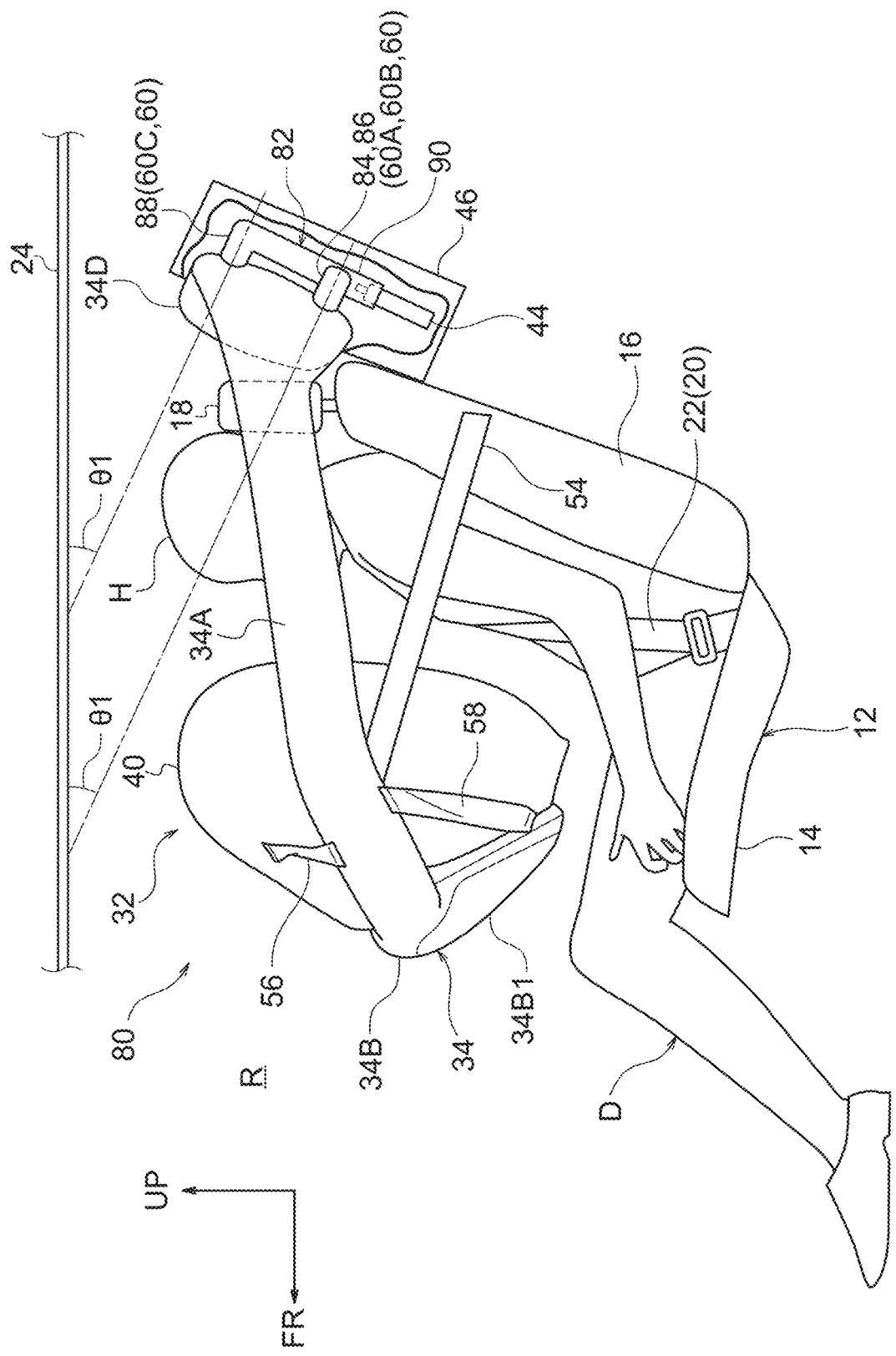
FIG. 22 is a side view of main portions illustrating, partially and in an enlarged manner, a state in which the airbag has inflated and expanded in an airbag device relating to a modified example.

For example, in the above embodiment, the airbag device 30 is structured to have the three inflators 44, but the number of the inflators 44 can be changed appropriately. For example, as with airbag device 80 illustrated in FIG. 22, there may be a structure equipped with the one inflator 44.

In the airbag device 80, the airbag 32 receives a supply of gas from the one inflator 44 via a diffuser 82, which communicates with the interior of the front-rear chamber 34, and inflates and expands. Because the structure of the airbag 32 is similar to that of the above-described embodiment, detailed description thereof is omitted.

The diffuser 82 is manufactured from a metal pipe, and has rectilinear sections that are directed toward the front-rear chamber 34. Specifically, the diffuser 82 is connected to the rear end portions of the pair of front-rear extending portions 34A of the front-rear chamber 34, and has a first tubular portion 84 and a second tubular portion 86 that form rectilinear sections. Further, the diffuser 82 has a third tubular portion 88 that is connected to the length direction central portion of the rear connecting portion 34D of the front-rear chamber 34 and forms a rectilinear section.

The first tubular portion 84, the second tubular portion 86 and the third tubular portion 88 form the gas supply paths 60 that are rectilinear. The first tubular portion 84 forms the first gas supply path 60A that is similar to the above-described embodiment. The second tubular portion 86 forms the second gas supply path 60B that is similar to the above-described embodiment. The third tubular portion 88 forms the third gas supply path 60C that is similar to the above-described embodiment.

Because the structures of the first gas supply path 60A, the second gas supply path 60B and the third gas supply path 60C are similar to those of the above-described embodiment, detailed description thereof is omitted.

Further, the diffuser 82 has a fourth tubular portion 90 that connects the seat rear side end portions of the first tubular portion 84, the second tubular portion 86 and the third tubular portion 88 together. The fourth tubular portion 90 has a lower end portion that extends in the seat vertical direction, and the gas jetting port of the inflator 44 is fixed to this lower end portion. Therefore, when gas is jetted out from the inflator 44, the gas is supplied through the fourth tubular portion 90 of the diffuser 82 to the first tubular portion 84, the second tubular portion 86 and the third tubular portion 88. Then, the gas is supplied from the first tubular portion 84 and the second tubular portion 86 into the pair of front-rear extending portions 34A of the front-rear chamber 34. Further, the gas is supplied from the third tubular portion 88 into the rear connecting portion 34D of the front-rear chamber 34.

The inflator 44 is disposed in a posture in which the axial direction thereof runs along the vertical direction of the seatback 16. For example, a pair of an upper and a lower stud bolt is provided at the inflator 44. The pair of stud bolts passes through the diffuser 82, the module case 46 and an unillustrated frame of the seatback 16, and nuts are screwed-together with the respective stud bolts. Due thereto, the diffuser 82, the inflator 44 and the module case 46 are fixed to the frame of the seatback 16.

In the airbag device 80 of this structure as well, the airbag 32 can be inflated and expanded in the same way as in the above-described embodiment. Therefore, similar operation and effects can be obtained.

Further, in the airbag device 80, the airbag 32 can be inflated and expanded by receiving a supply of gas from the one inflator 44. Therefore, as compared with the above-described embodiment, the number of inflators that are installed can be reduced, and a reduction in the manufacturing cost can be devised.

Further, in the airbag device 80, the inflator 44 is disposed in a posture in which the axial direction thereof runs along the vertical direction of the seatback 16. Therefore, the module case 46 can be made to be thin in the seat front-rear direction, and compactness of the airbag device 80 can be devised.

Further, the above-described embodiment is structured such that the supplying of gas to the first gas supply path 60A, the second gas supply path 60B and the third gas supply path 60C is carried out simultaneously, but the present disclosure is not limited to this. For example, from the standpoint of pushing the airbag main body 40 out toward the seat front side immediately after the start of inflation and expansion of the airbag 32, there may be a structure in which the supplying of gas to the first gas supply path 60A and the second gas supply path 60B is started later than the supplying of gas to the third gas supply path 60C.

The above-described embodiment is structured such that the first gas supply path 60A, the second gas supply path 60B and the third gas supply path 60C are provided as the gas supply paths 60, but the present disclosure is not limited to this. For example, the third gas supply path 60C may be omitted. In this case, the structure of the airbag 32 may be a structure in which the rear connecting portion 34D is omitted.

What is claimed is:

1. An airbag device comprising:
   an inflator generating gas at a time of a collision of a vehicle; and
   an airbag to which the gas is supplied, and that inflates and expands from a seat rear side of an upper portion of a vehicle seat toward a seat front side, and slips-through between a ceiling of a vehicle cabin and a head of a passenger seated in the vehicle seat,
   wherein the airbag has at least one gas supply path that is provided so as to be directed toward the seat front side and whose angle of incidence with respect to the ceiling in a side view seen from a seat transverse direction is set to be an acute angle.

2. The airbag device of claim 1, wherein the angle of incidence is set to be 15°~35°.

3. The airbag device of claim 1, wherein the airbag has:
   a front-rear chamber having a pair of front-rear extending portions that pass left and right both sides of the head of the passenger seated in the vehicle seat and inflate and expand toward the seat front side, and a front connecting portion connecting front end portions of the pair of front-rear extending portions in the seat transverse direction; and
   an airbag main body that, at a seat rear side of the front connecting portion, inflates and expands toward the passenger side later than the front-rear chamber, and that, at a time of restraining the passenger, is compressed in a seat front-rear direction while stretching the front-rear chamber in the seat front-rear direction.

4. The airbag device of claim 3, wherein
   the gas supply paths include a first gas supply path and a second gas supply path provided at rear end portions of the pair of front-rear extending portions, and
   the first gas supply path and the second gas supply path are inclined toward outer sides in the seat transverse direction so as to be at a predetermined angle of inclination with respect to the seat front-rear direction as seen in a plan view.

5. The airbag device of claim 4, wherein the angle of inclination is set to be 10°~45°.

6. The airbag device of claim 3, wherein the front-rear chamber further has a rear connecting portion that is accommodated at a seat rear side of the airbag main body in a state before gas is supplied, and that connects rear end portions of the pair of front-rear extending portions in the seat transverse direction.

7. The airbag device of claim 6, wherein the gas supply paths include a third gas supply path connected to a rear side surface of the rear connecting portion.

* * * * *